US011874746B2

(12) United States Patent
Bensberg et al.

(10) Patent No.: US 11,874,746 B2
(45) Date of Patent: *Jan. 16, 2024

(54) TRANSACTION COMMIT PROTOCOL WITH RECOVERABLE COMMIT IDENTIFIER

(71) Applicant: SAP SE, Walldorf (DE)

(72) Inventors: Christian Bensberg, Heidelberg (DE); Steffen Geissinger, Wiesloch (DE); Juchang Lee, Seoul (KR); Chang Gyoo Park, Seoul (KR); Kyu Hwan Kim, Seoul (KR); Deok Koo Kim, Seoul (KR)

(73) Assignee: SAP SE, Walldorf (DE)

( * ) Notice: Subject to any disclaimer, the term of this patent is extended or adjusted under 35 U.S.C. 154(b) by 459 days.

This patent is subject to a terminal disclaimer.

(21) Appl. No.: 16/944,015

(22) Filed: Jul. 30, 2020

(65) Prior Publication Data
US 2020/0356449 A1 Nov. 12, 2020

Related U.S. Application Data

(63) Continuation of application No. 15/430,091, filed on Feb. 10, 2017, now Pat. No. 10,761,946.

(51) Int. Cl.
*G06F 11/14* (2006.01)
(52) U.S. Cl.
CPC ...... *G06F 11/1464* (2013.01); *G06F 2201/87* (2013.01)
(58) Field of Classification Search
CPC .......................... G06F 11/1464; G06F 2201/87
USPC ........................................................ 707/678
See application file for complete search history.

(56) References Cited

U.S. PATENT DOCUMENTS

| 9,965,359 B2* | 5/2018 | Lee .......................... G06F 16/27 |
| 10,095,764 B2* | 10/2018 | Park .................... G06F 16/2365 |
| 2003/0061537 A1 | 3/2003 | Cha et al. |
| 2008/0065670 A1 | 5/2008 | Cha et al. |

(Continued)

OTHER PUBLICATIONS

Aulbach et al., "Extensibility and Data Sharing in Evolving Multi-Tenant Databases," in 2011 IEEE 27th International Conference on Data Engineering. IEEE, pp. 99-110 (2011).

(Continued)

*Primary Examiner* — Hosain T Alam
*Assistant Examiner* — Saba Ahmed
(74) *Attorney, Agent, or Firm* — Klarquist Sparkman, LLP

(57) ABSTRACT

Technologies are described for facilitating database system recovery in a distributed database environment having a master node and at least one slave node. The master node maintains an in-memory reference that includes transaction identifiers and their corresponding commit identifiers. When a slave node requests that a commit identifier be assigned to a transaction, the transaction and commit identifiers for the transaction are added to the in-memory reference. The commit identifier is sent by the master node to the slave node. The slave node writes a log entry to a commit log that includes the transaction identifier and the assigned commit identifier. If the database system is interrupted before the slave node writes the commit log entry, the slave node can request the commit identifier for the transaction from the master node, which retrieves the identifier from the in-memory reference.

20 Claims, 11 Drawing Sheets

(56) References Cited

U.S. PATENT DOCUMENTS

| | | | |
|---|---|---|---|
| 2010/0191884 A1* | 7/2010 | Holenstein | G06F 11/2094 707/613 |
| 2012/0084273 A1 | 4/2012 | Lee et al. | |
| 2012/0084274 A1 | 4/2012 | Renkes et al. | |
| 2012/0109895 A1* | 5/2012 | Zwilling | G06F 16/2308 707/648 |
| 2012/0166407 A1 | 6/2012 | Lee et al. | |
| 2012/0167098 A1 | 6/2012 | Lee et al. | |
| 2013/0117237 A1* | 5/2013 | Thomsen | G06F 11/1474 707/E17.007 |
| 2013/0124475 A1 | 5/2013 | Hildenbrand et al. | |
| 2013/0166534 A1 | 6/2013 | Yoon et al. | |
| 2013/0166553 A1 | 6/2013 | Yoon et al. | |
| 2013/0166554 A1 | 6/2013 | Yoon et al. | |
| 2013/0275457 A1 | 10/2013 | Lee et al. | |
| 2013/0275467 A1 | 10/2013 | Lee et al. | |
| 2013/0275468 A1 | 10/2013 | Lee et al. | |
| 2013/0275550 A1 | 10/2013 | Lee et al. | |
| 2013/0290249 A1* | 10/2013 | Merriman | G06F 16/278 707/610 |
| 2013/0290282 A1 | 10/2013 | Faerber et al. | |
| 2013/0304714 A1 | 11/2013 | Lee et al. | |
| 2013/0332927 A1* | 12/2013 | Tang | G06F 9/45545 718/1 |
| 2014/0122439 A1 | 5/2014 | Faerber et al. | |
| 2014/0122452 A1 | 5/2014 | Faerber et al. | |
| 2014/0136473 A1 | 5/2014 | Faerber et al. | |
| 2014/0136788 A1 | 5/2014 | Faerber et al. | |
| 2014/0149353 A1 | 5/2014 | Lee et al. | |
| 2014/0149368 A1 | 5/2014 | Lee et al. | |
| 2014/0149527 A1 | 5/2014 | Lee et al. | |
| 2014/0156619 A1 | 6/2014 | Lee et al. | |
| 2014/0222418 A1 | 8/2014 | Richtarsky et al. | |
| 2014/0244628 A1 | 8/2014 | Yoon et al. | |
| 2014/0297686 A1 | 10/2014 | Lee et al. | |
| 2014/0304219 A1 | 10/2014 | Yoon et al. | |
| 2015/0074082 A1 | 5/2015 | Yoon et al. | |
| 2015/0149409 A1 | 5/2015 | Lee et al. | |
| 2015/0149413 A1 | 5/2015 | Lee et al. | |
| 2015/0149426 A1 | 5/2015 | Kim et al. | |
| 2015/0149704 A1 | 5/2015 | Lee et al. | |
| 2015/0149736 A1 | 5/2015 | Kwon et al. | |
| 2015/0178343 A1 | 6/2015 | Renkes et al. | |
| 2015/0242400 A1 | 8/2015 | Bensberg et al. | |
| 2015/0242451 A1 | 8/2015 | Bensberg et al. | |
| 2015/0261805 A1 | 9/2015 | Lee et al. | |

OTHER PUBLICATIONS

Bailis et al., "Hat, Not Cap: Towards Highly Available Transactions", in Proceedings of the 14th USENIX Conference on Hot Topics in Operating Systems, pp. 24, USENIX Association (2013).
Bailis et al., "Scalable Atomic Visibility with Ramp Transactions," in Proceedings of the 2014 ACM SIGMOD International Conference on Management of Data. ACM, pp. 27-38 (2014).
Barber et al., "In-Memory Blu Acceleration in IBM's db2 and dashdb: Optimized for Modern Workloads and Hardware Architectures," in Proceedings of the 2015 International Conference on Data Engineering (ICDE). IEEE (2015).
Berenson et al., "A Critique of Ansi SQL Isolation Levels," ACM SIGMOD Record, vol. 24, No. 2, pp. 1-10, (1995).
Bernstein et al., "Concurrency Control and Recovery in Database Systems," (1987).
Bernstein et al., "Optimizing Optimistic Concurrency Control for Tree-Structured, Log-Structured Databases," in Proceedings of the 2015 ACM SIGMOD International Conference on Management of Data. ACM, pp. 1295-1309 (2015).
Binnig et al., "Distributed Snapshot Isolation: Global Transactions Pay Globally, Local Transactions Pay Locally," The International Journal on Very Large Data Bases, vol. 23, No. 6, pp. 987-1011 (2014).
Cha et al., "An Extensible Architecture for Main-Memory Real-Time Storage Systems", RTCSA : 67-73 (1996).
Cha et al., "An Object-Oriented Model for FMS Control", J. Intelligent Manufacturing 7(5): 387-391 (1996).
Cha et al., "Cache-Conscious Concurrency Control of Main-Memory Indexes on Shared-Memory Multiprocessor Systems", VLDB: 181-190 (2001).
Cha et al., "Efficient Web-Based Access to Multiple Geographic Databases Through Automatically Generated Wrappers", WISE : 34-41 (2000).
Cha et al., "Interval Disaggregate: A New Operator for Business Planning", PVLDB 7(13): 1381-1392 (2014).
Cha et al., "Kaleidoscope: A Cooperative Menu-Guided Query Interface", SIGMOD Conference : 387 (1990).
Cha et al., "Kaleidoscope Data Model for An English-like Query Language", VLDB : 351-361 (1991).
Cha et al., "MEADOW: A Middleware for Efficient Access to Multiple Geographic Databases Through OpenGIS Wrappers", Softw., Pract. Exper. 32(4): 377-402 (2002).
Cha et al., "Object-Oriented Design of Main-Memory DBMS for Real-Time Applications", RTCSA : 109-115 (1995).
Cha et al., "Paradigm Shift to New DBMS Architectures: Research Issues and Market Needs", ICDE: 1140 (2005).
Cha et al., "P*TIME: Highly Scalable OLTP DBMS for Managing Update-Intensive Stream Workload", VLDB: 1033-1044 (2004).
Cha et al., "Xmas: An Extensible Main-Memory Storage System", CIKM : 356-362 (1997).
Chang et al., "Bigtable: A Distributed Storage System for Structured Data," ACM Transactions on Computer Systems (TOCS), vol. 26, No. 2, p. 4, (2008).
Chaudhuri et al., "An Overview of Data Warehousing and OLAP Technology," ACM Sigmod Record, vol. 26, No. 1, pp. 65-74 (1997).
Cooper et al., "Pnuts: Yahoo!'s Hosted Data Serving Platform," Proceedings of the VLDB Endowment, vol. 1, No. 2, pp. 1277-1288 (2008).
DeCandia et al., "Dynamo: Amazon's Highly Available Key-Value Store," ACM SIGOPS Operating Systems Review, vol. 41, No. 6, pp. 205-220 (2007).
DeWitt et al., "Parallel Database Systems: the Future of High Performance Database Systems," Communications of the ACM, vol. 35, No. 6, pp. 85-98 (1992).
Diaconu et al., "Hekaton: SQL Server's Memory-Optimized OLTP Engine," in Proceedings of the 2013 ACM SIGMOD International Conference on Management of Data. ACM, pp. 1243-1254 (2013).
Du et al., "Clock-Si: Snapshot Isolation for Partitioned Data Stores Using Loosely Synchronized Clocks," in Reliable Distributed Systems (SRDS), 2013 IEEE 32nd International Symposium on. IEEE, pp. 173-184 (2013).
Farber et al., SAP HANA Database: Data Management for Modern Business Applications. SIGMOD Record 40(4): 45-51 (2011).
Farber et al., "The SAP HANA Database—An Architecture Overview." IEEE Data Eng. Bull., vol. 35, No. 1, pp. 28-33 (2012).
Fekete et al., "Making Snapshot Isolation Serializable," ACM Transactions on Database Systems (TODS), vol. 30, No. 2, pp. 492-528 (2005).
Hwang et al., "Performance Evaluation of Main-Memory R-tree Variants", SSTD: 10-27 (2003).
Kallman et al., "Hstore: A High-Performance, Distributed Main Memory Transaction Processing System," Proceedings of the VLDB Endowment, vol. 1, No. 2, pp. 1496-1499 (2008).
Kemper et al., "Hyper: A Hybrid OLTP & OLAP Main Memory Database System Based on Virtual Memory Snapshots," in Data Engineering (ICDE), 2011 IEEE 27th International Conference on. IEEE, pp. 195-206 (2011).
Kim et al., "Optimizing Multidimensional Index Trees for Main Memory Access", SIGMOD Conference: 139-150 (2001).
Kung et al., "On Optimistic Methods for Concurrency Control," ACM Transactions on Database Systems (TODS), vol. 6, No. 2, pp. 213-226 (1981).
Lahiri et al., "Cache Fusion: Extending Shared-Disk Clusters with Shared Caches," in VLDB, vol. 1, pp. 683-686 (2001).

(56) References Cited

OTHER PUBLICATIONS

Lahiri et al., "Oracle Timesten: An In-Memory Database for Enterprise Applications." IEEE Data Eng. Bull., vol. 36, No. 2, pp. 6-13 (2013).
Larson et al., "High-Performance Concurrency Control Mechanisms for Main-Memory Databases," Proceedings of the VLDB Endowment, vol. 5, No. 4, pp. 298-309, (2011).
Lee et al., "A Performance Anomaly Detection and Analysis Framework for DBMS Development", IEEE Trans. Knowl. Data Eng. 24(8): 1345-1360 (2012).
Lee et al., "Differential Logging: A Commutative and Associative Logging Scheme for Highly Parallel Main Memory Databases", ICDE 173-182 (2001).
Lee et al., "High-Performance Transaction Processing in Sap Hana." IEEE Data Eng. Bull., vol. 36, No. 2, pp. 28-33 (2013).
Lee et al., "SAP HANA Distributed In-Memory Database System: Transaction, Session, and Metadata Management," in Data Engineering (ICDE), 2013 IEEE 29th International Conference on. IEEE, pp. 1165-1173 (2013).
Neumann et al., "Fast Serializable Multi-Version Concurrency Control for Main- Memory Database Systems," in Proceedings of the 2015 ACM SIGMOD International Conference on Management of Data. ACM, pp. 677-689 (2015).
Pandis et al., "Dataoriented Transaction Execution," Proceedings of the VLDB Endowment, vol. 3, No. 1-2, pp. 928-939 (2010).
Park et al., Xmas: An Extensible Main-Memory Storage System for High- Performance Applications. SIGMOD Conference : 578-580 (1998).
Plattner, H., "A Common Database Approach for OLTP and OLAP Using an In-Memory Column Database", in Proceedings of the 2009 ACM SIGMOD International Conference on Management of Data, pp. 1-2. ACM (2009).
Qiao et al., "On Brewing Fresh Espresso: Linkedin's Distributed Data Serving Platform," in Proceedings of the 2013 ACM SIGMOD International Conference on Management of Data. ACM, pp. 1135-1146 (2013).
Roy et al., "The Homeostasis Protocol: Avoiding Transaction Coordination Through Program Analysis," in Proceedings of the 2015 ACM SIGMOD International Conference on Management of Data. ACM, pp. 1311-1326 (2015).
Sikka et al. "Efficient Transaction Processing in SAP HANA Database: the End of a Column Store Myth", in Proceedings of the 2012 ACM SIGMOD International Conference on Management of Data, pp. 731-742. ACM (2012).
Tu et al., "Speedy Transactions in Multicore In-Memory Databases," in Proceedings of the Twenty-Fourth ACM Symposium on Operating Systems Principles. ACM, pp. 18-32 (2013).
Vogels, W., "Eventually Consistent," Communications of the ACM, vol. 52, No. 1, pp. 40-44 (2009).
Weikum et al., "Transactional Information Systems: Theory, Algorithms, and the Practice of Concurrency Control and Recovery," (2001).
Yoo et al., "A Middleware Implementation of Active Rules for ODBMS", DASFAA : 347-354 (1999).
Yoo et al., "Integrity Maintenance in a Heterogeneous Engineering Database Environment", Data Knowl. Eng. 21(3): 347-363 (1997).
Zamanian et al., "Locality-Aware Partitioning in Parallel Database Systems," in Proceedings of the 2015 ACM SIGMOD International Conference on Management of Data. ACM, pp. 17-30 (2015).
"HANA database lectures," retrieved from http://cse.yeditepe.edu.tr/~odemir/spring2014/cse415/HanaDatabase, on Mar. 2014, 71 pages.
Loews, Bart, "What are the main differences between the four types of NoSql databases (KeyValue Store, Column-Oriented Store, Document-Oriented, Graph Database)?" retrieved from https://www.quora.com/What-are-the-main-differences-between-the-four-types-of-NoSql-databases-KeyValue-Store-Column-Oriented-Store-Document-Oriented-Graph-Database, on Dec. 28, 2016, 1 page.
"Creating database callback functions," retrieved from http://infocenter-archive.sybase.com/help/index.jsp?topic=/com.sybase.help.doc.ebiz_impact5.4.5.rb_545_2/html/rb_545_2/rb_545_222.htm, on or before Jan. 27, 2017, 1 page.
"Database JSON Developer's Guide. 25 Indexes for JSON Data," retrieved from https://docs.oracle.com/database/122/ADJSN/indexes-for-json-data.htm#ADJSN-GUID-8A1B098E-D4FE-436E-A715-D8B465655COD, on or before Jan. 27, 2017, 18 pages.
"Database index," retrieved from https://en.wikipedia.org/wiki/Database_index, on or before Jan. 27, 2017, 8 pages.
"Performing transactions," retrieved from http://www.opis.io/database/3.6/transactions, on or before Jan. 27, 2017, 5 pages.
"Event Handler and Callback Registration," retrieved from http://help.sap.com/saphelp_crmhana/helpdata/en/53/e3fa5691c147208ea5e61506d99075/content.htm, on or before Jan. 27, 2017, 3 pages.
"Web SQL Database," retrieved from https://webcache.googleusercontent.com/search?q=cache:O-JN0JDLraEJ:https://www.w3.org/TR/webdatabase/+&cd=9&hl=en&ct=clnk&gl=us, on or before Jan. 27, 2017, 31 pages.
"How can I pass argument in transaction callback function," retrieved from http://stackoverflow.com/questions/8775955/how-can-i-pass-argument-in-transaction-callback-function, on or before Jan. 27, 2017, 4 pages.
Tonon, Laurent, "Tutorial: Web SQL Database," retrieved from https://newcircle.com/s/post/208/tutorial_web_sql_database, on or before Jan. 27, 2017, 7 pages.
"Columns Vs Row Data Storage," retrieved from http://saphanatutorial.com/column-data-storage-and-row-data-storage-sap-hana/, on or before Jan. 27, 2017, 23 pages.
Sasaki, Bryce Merkl, "Graph Databases for Beginners: A Tour of Aggregate Stores," retrieved from https://neo4j.com/blog/aggregate-stores-tour/, on or before Jan. 27, 2017, 10 pages.
Golba, Rick, "Row Store and Column Store Databases," retrieved from https://www.percona.com/blog/2016/12/14/row-store-and-column-store-databases/, on or before Jan. 27, 2017, 11 pages.
"Table Distribution in SAP HANA," retrieved from https://help.sap.com/saphelp_hanaplatform/helpdata/en/c3/652853bb571014bb5590ff822a4e2a/content.htm, on or before Jan. 27, 2017, 2 pages.
Periasamy, Jothi, "Realize and Accelerate Your Digital Transformation With SAP HANA VORA—IoT for Mainstream Business," retrieved from https://www.linkedin.com/pulse/realize-accelerate-your-digital-transformation-sap-hana-periasamy, on or before Jan. 27, 2017, 24 pages.
Rouse, Margaret, "SAP HANA Vora," retrieved from http://searchsap.techtarget.com/definition/SAP-HANA-Vora, on or before Jan. 27, 2017, 6 pages.

\* cited by examiner

TRANSACTION COMMIT PROTOCOL WITH RECOVERABLE COMMIT IDENTIFIER

CROSS REFERENCE TO RELATED APPLICATIONS

This is a Continuation of U.S. patent application Ser. No. 15/430,091, filed Feb. 10, 2017, which is hereby incorporated herein by reference.

FIELD

The present disclosure generally relates to recovering a distributed database system. Particular implementations relate to facilitating recovery operations at a slave node by providing efficient access to a commit identifier associated with a transaction at the slave node.

BACKGROUND

Database performance can be enhanced by distributing information, such as source tables, among multiple hosts. For example, a number of hosts may store different tables in the database system, or tables can be partitioned among multiple hosts. The ability to distribute a database system among multiple hosts can provide opportunities to increase system performance, such as by distributing workloads among CPUs located at the different hosts, rather than relying on the capabilities of a single host. However, distributed systems can be more complex to recover after a crash or other disruption.

In typical database recovery schemes, a state of the database system prior to the occurrence of an interruption can be restored without using commit identifiers for in-doubt transactions, transactions which have begun a commit process, but which have not finished committing. For example, database operations that are pending when the database system is interrupted can be restarted using a new version of the database system, such as a version where the in-doubt transactions have been committed. Persisted data used to restore the database system nodes is typically stored in a sequential format, such that the persisted data can be replayed or reloaded during a recovery or restart process in sequence to restore a state of the database system. Because of this sequential storage, commit identifiers of in-doubt transactions are not needed. Room for improvement in the management of database transactions remains in database systems where commit identifiers are needed by a slave node during recovery or restart following a database system interruption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for restoring a distributed database system having a master node and one or more slave nodes. At the master node, a transaction identifier is received from a slave node. The transaction identifier is associated with a database transaction. The master node assigns a commit identifier to the transaction. The master node stores the transaction identifier and commit identifier in an in-memory reference (e.g., a table represented in a data structure or another representation of the information). The in-memory reference can include transaction identifiers and commit identifiers for each of a plurality of database transactions. The master node can take additional actions, such as sending the commit identifier to the slave node. The master node can also write the transaction identifier and the assigned commit identifier to a commit log.

In particular implementations, the master node can periodically persist the in-memory reference, the commit log, or both. In some aspects, a lock can be acquired prior to storing the transaction identifier and commit identifier in the in-memory reference. The lock can be released after a commit log entry is written. The lock can prevent a persistence operation from occurring until the lock is released, such that updating the in-memory reference and writing the commit log are atomic.

In another aspect, at a slave node, a database transaction is received that includes one or more requests for a database operation, such as data manipulation statements. A precommit log entry is written by the slave node. The precommit log entry includes a transaction identifier associated with the database transaction. The slave node sends a request to the master node to assign a commit identifier to the transaction. The request includes the transaction identifier. A commit identifier is received by the slave node from the master node. The slave node writes a commit log entry that includes the transaction identifier and the commit identifier received from the master node. In some aspects, the slave node sends a commit confirmation to the master node after the commit log entry is written.

In a further aspect, at a slave node, a database transaction is received that includes one or more requests for a database operation. The slave node sends a request to the master node to assign a commit identifier to the transaction. The request includes the transaction identifier, and can include additional information, such as a slave log position associated with the transaction. The slave node writes a log entry that includes the transaction identifier, and optionally includes the slave log position. The slave node receives a commit identifier for the transaction from the master node and writes a commit log entry for the transaction. The commit log entry includes the transaction identifier and the commit identifier. In some implementations, after the commit log entry is written by the slave node, the slave node sends a commit confirmation to the master node.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
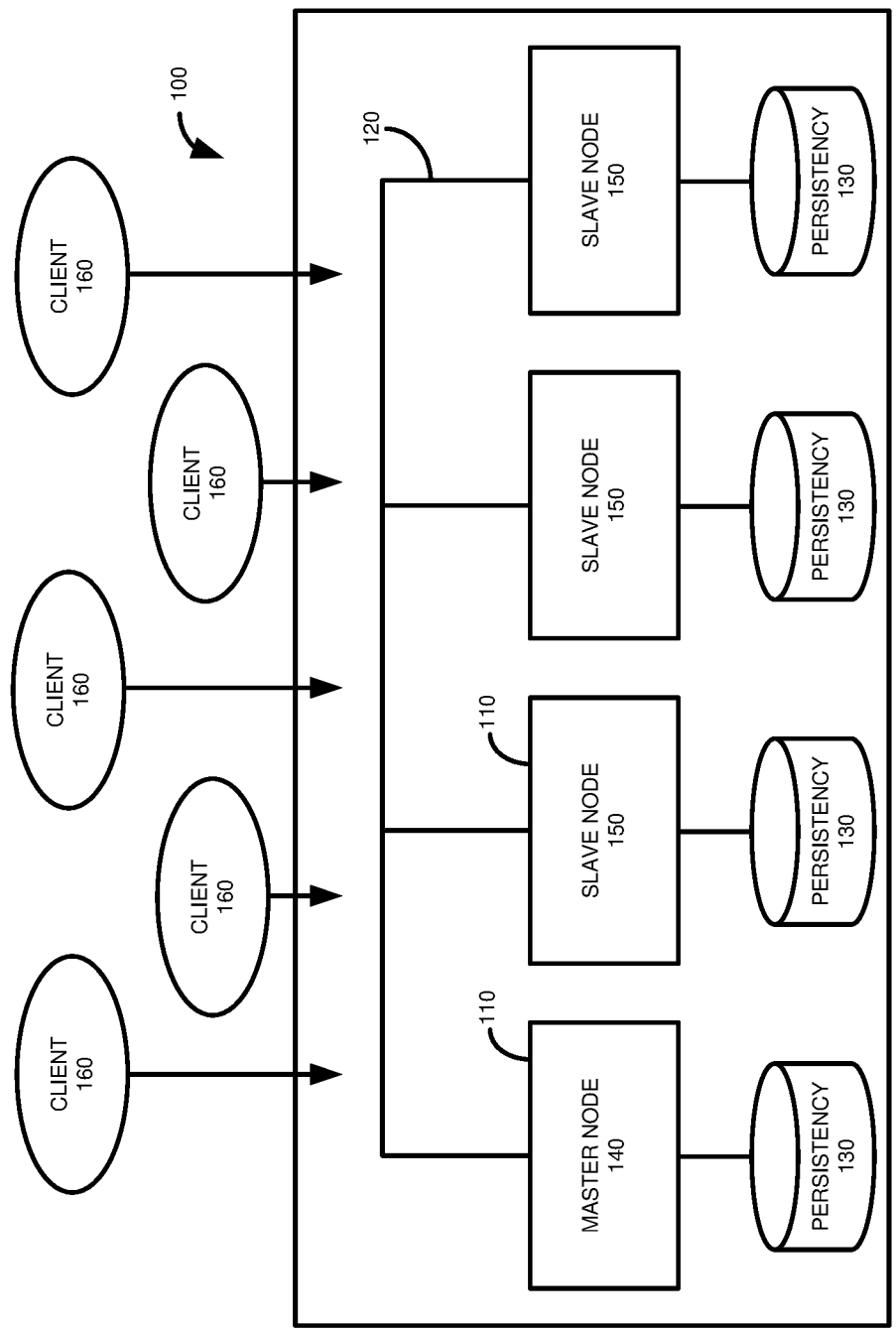
FIG. 1 is a diagram schematically depicting a distributed database environment having a master node and a plurality of slave nodes.

Database systems are increasingly designed and optimized for memory-centric, massively-parallel data processing, not only in single database systems, but also in multi-host distributed database systems. Partitioning and distributing a database into multiple hosts is a desirable feature especially for high-performance in-memory database systems (such as the HANA or VORA database systems of SAP SE of Walldorf, Germany), because it can leverage larger in-memory database spaces and a higher number of CPU cores beyond the limitations of a single physical machine (also referred to as a host, or node). For example, by partitioning and distributing large and fast growing fact tables over multiple hosts while replicating infrequently-updated dimension tables in a data warehouse system, or by partitioning a multi-tenant database into multiple hosts by tenants, it is typically possible to handle larger databases and higher workloads. However, transaction processing in distributed database systems can be more complex to manage during database system operation, and distributed database systems can be more complex to recover after a crash or other disruption.

Database operations, such as queries and DML statements, are typically assigned a timestamp representing a particular database system state (e.g., a "snapshot" of the database system). This snapshot timestamp can be used to provide that a database operation sees a consistent view of the database system during execution. That is, changes made by subsequent database operations will not be visible to the original operation. Completed or committed database transactions can be assigned an identifier (e.g., a commit ID) that can be used to represent a particular database system state (which can be associated with a snapshot of the database system—which transactions were committed at a particular state) and to recover that state. For example, committed transactions can be replayed in their commit order to reproduce a database system state.

According to one implementation of a database system, database operations pending when a database system disruption (e.g., an event resulting in database system recovery or restart) occurs are aborted and restarted as part of the recovery process. When they are restarted, the database operations are typically assigned a new snapshot timestamp. Because the database operations are assigned a new snapshot timestamp, after recovery of the database system, including log replay, prior transactions can be treated as having been committed before the database operations were restarted. This can simplify the recovery process, as information useable to recover a prior database system state (such as commit identifiers associated with transactions, which can be used to define database "snapshots") do not need to be preserved, limiting the information that should be maintained for database system recovery.

While database systems are increasingly operated with all or a substantial portion of the database data located in-memory, rather than in secondary storage, typically, database data (e.g., the contents of database tables, such as row and column values, or documents) is periodically written to persistent storage (e.g., hard disk or magnetic tape). In between saves, information can be persisted (e.g., logged) regarding executed database operations (such as data manipulation (DML) statements, such as writes, updates, or deletions to database records, for example, statements in the structured query language (SQL)). Persistent storage can be used to recover the database system in the event of a crash or other event.

Persisted data is typically stored in a sequential format. During recovery, saved data can first be restored, and then the saved information, such as in the form of redo log entries, can be replayed, from log backups, at the database system to restore a prior database system state. For example, a node of the database system, or at least a particular type of data for the node, can be restored by sequentially reading and reloading or replaying the contents of a file. Because of the sequential storage, information usable to order transactions (e.g. transaction commit identifiers) at the node need not be stored.

Coordination between nodes in a distributed database system, as well as logging or otherwise persisting metadata used in coordination, can increase resource use and negatively impact database system performance. For example, transactions involving multiple nodes can require multiple communications between nodes, increasing network and CPU use, and increasing the time to process the database operations. Similarly, if more information is logged, the database system will require increased storage (e.g., secondary storage), and performance may be reduced during device I/O. Thus, a database system may balance tradeoffs between performance and the ability to completely recover a prior database system state. Database systems commonly store persisted information in a sequential format, and restart database operations using newly assigned timestamps, in order to improve performance and reduce resource use.

However, some types of database systems, such as those storing data as JavaScript objects, can persist information other than sequentially in a single file. For example, an object store may be recovered by alternating replay or reloading of multiple different files. In such cases, if other information sufficient to reconstitute a transaction order is not persisted, at least certain transactions will not be restored to their prior state, which can lead to inaccurate results or data corruption. Thus, existing database transaction and persistence protocols may not be adequate for such systems.

Similarly, in some distributed database systems, at least certain database system nodes include database operations that are restarted after database system recovery using their originally assigned snapshot timestamps. In some cases, all of the nodes can include database operations that continue after system restart using their original snapshot timestamps. In other cases, some nodes can include database operations that are restarted or continued after system recovery using their original snapshot timestamps, and other nodes can include database operations that are restarted after system recovery using a newly assigned snapshot timestamp. In yet further cases, a particular database system node can include both database operations that are restarted after system recovery using a newly assigned snapshot timestamp and database operations that are restarted or continued using their originally assigned snapshot timestamps.

Existing protocols for database operations typically do not allow for restarting or continuing database operations using their originally assigned snapshot timestamps after the database system has been recovered or restarted. That is, for at least certain database operations, such as those accessing, or having a dependency on, database transactions that were not fully committed prior to interruption of the database system, the database system may not contain (e.g., persist) all of the information necessary for such database operations to execute using the original database snapshot, which can lead to inaccurate results or data corruption.

The present disclosure describes protocols providing information sufficient for database operations to be restarted or continued using their originally assigned timestamps. The present disclosure also provides protocols allowing for the state of the database system to be restored without requiring that data be persisted in a single file or in a sequential format. At least certain protocols can reduce impacts on database system resources and performance resulting from providing such functionality. As will be further described, in at least some aspects, the functionality can be provided by maintaining, such as at a master node, an in-memory reference (e.g., a table) correlating transaction identifiers and commit identifiers for at least certain transactions, such as transactions which have not yet been fully committed at a slave node.

Example 2—Distributed Database Environment

This Example 2 describes a distributed database system that may employ at least certain embodiments of the disclosed innovations in database system recovery. FIG. 1 illustrates a database environment 100 having a plurality of database nodes 110 connected through a network 120. In a particular example, the network 120 is a high-speed/low-latency network. A node, or host, refers to a computing system having a processor and memory. Unless the context clearly indicates otherwise, a node can refer to the host in a single host system (such as a host in a non-distributed system), a host in a system having a master node and a single slave node, or one of a plurality of hosts in a system having a master node and a plurality of slave nodes.

As shown, each node 110 has its own persistency store 130. In some examples, one or more nodes 110 may have shared storage. In a particular example, such as for disaster recovery purposes, a remote instance of the system 100 can be configured to act as a hot standby cluster by continuously replaying logs shipped from the primary cluster 100.

The database nodes 110 are asymmetric, in some respects, since database node 140 has the role of a master or coordinator node and database nodes 150 function as slave or worker nodes. A master node refers to a node (or host) that manages information regarding the master node and one or more slave nodes. A slave node refers to a node that is installed on a different host than the master node and has at least some of its activities or operations controlled or regulated by a master node. In at least some aspects, a database node 110 may be both a master node and a slave node. For example, the node 110 can be designated to act as a master node (where one or more other nodes 110 can act as slave nodes) for some database operations, and as a slave node (where another node 110 acts as the master node, and, optionally, other nodes 110 may act as additional slave nodes) for other database operations.

The master node 140 and the slave nodes 150 are in communication, such as through the network 120, and may send and receive communications to and from one another. As used herein, the term "send" to a destination entity refers to any way of transmitting or otherwise conveying data within a computer system or between two computer systems, whether the data is directly conveyed or through one or more intermediate entities. Similarly, the term "receive," such as to receive from a source entity, refers to the receipt of data within a computer system or between two computer systems, whether the data is received directly from the computer system of original transmission or received through one or more intermediate entities.

Although the master node 140 stores tables and partitions, the master node 140 also can act as a metadata master and a transaction coordinator for transactions in a distributed database system, which can be local transaction at a node (e.g., a transaction with database operations occurring only at the master node or a single slave node) or distributed transactions (e.g. a transaction with database operations occurring at the master node and at least one slave node, or at multiple slave node). For example, when a client 160 seeks to access metadata at a slave node 150, the slave node retrieves the corresponding metadata from the master node 140 and caches it locally. The cached metadata for a specific database object will be valid until the next DDL (data definition language) transaction is committed for that particular database object. Furthermore, being the transaction coordinator, the master node 140 decides about the commit of multi-node write transactions and can mediate between the slave nodes 150 when they need to exchange transactional information with each other.

The database nodes 110 are symmetric, in other respects, as each node 110 has its own persistency store 130 for the results of persistency operations (e.g., log and checkpoint files). From the perspective of a client 160, in at least some implementations, an application may connect to any of the database nodes 110 and execute arbitrary read and write transactions. Tables can be partitioned and distributed across multiple database nodes 110. If a table has partitions defined via hash or range predicates, then those partitions can be distributed and stored in different nodes 110.

Example 3—Example Transaction Commit Protocol

Database operations that manipulate data can include multiple database operations (e.g., DML statements) in a transaction. The completion of a transaction can be indicated by the sending of a commit request from a database client to the database system. When a transaction is committed, the component DML statements are typically made visible to other users or other database operations (e.g., database operations assigned a snapshot identifier greater than or equal to a commit identifier for the committed transaction). In addition, upon commit, the transaction and its component DML statements can be written to persistent storage.

Committed transactions are typically assigned a unique identifier. For example, the database system (such as, with reference to FIG. 1, the coordinator or master node 140 for the transaction) can maintain a counter that assigns an identifier (e.g., a commit ID or commit timestamp, which can be associated with a commit time) to committed transactions. Unless indicated otherwise, the terms snapshot identifier and snapshot timestamp, and commit identifier and commit timestamp, are used interchangeably in the present disclosure. In some cases, the commit ID can be an integer that increments upon each transaction commit Thus, commit IDs can be used to represent the state of a database system, and to provide for ordering of transactions. When a database system is being restored or recovered, commit IDs can be used to ensure that transactions are replayed in the database system in the appropriate order.

Figure 2:
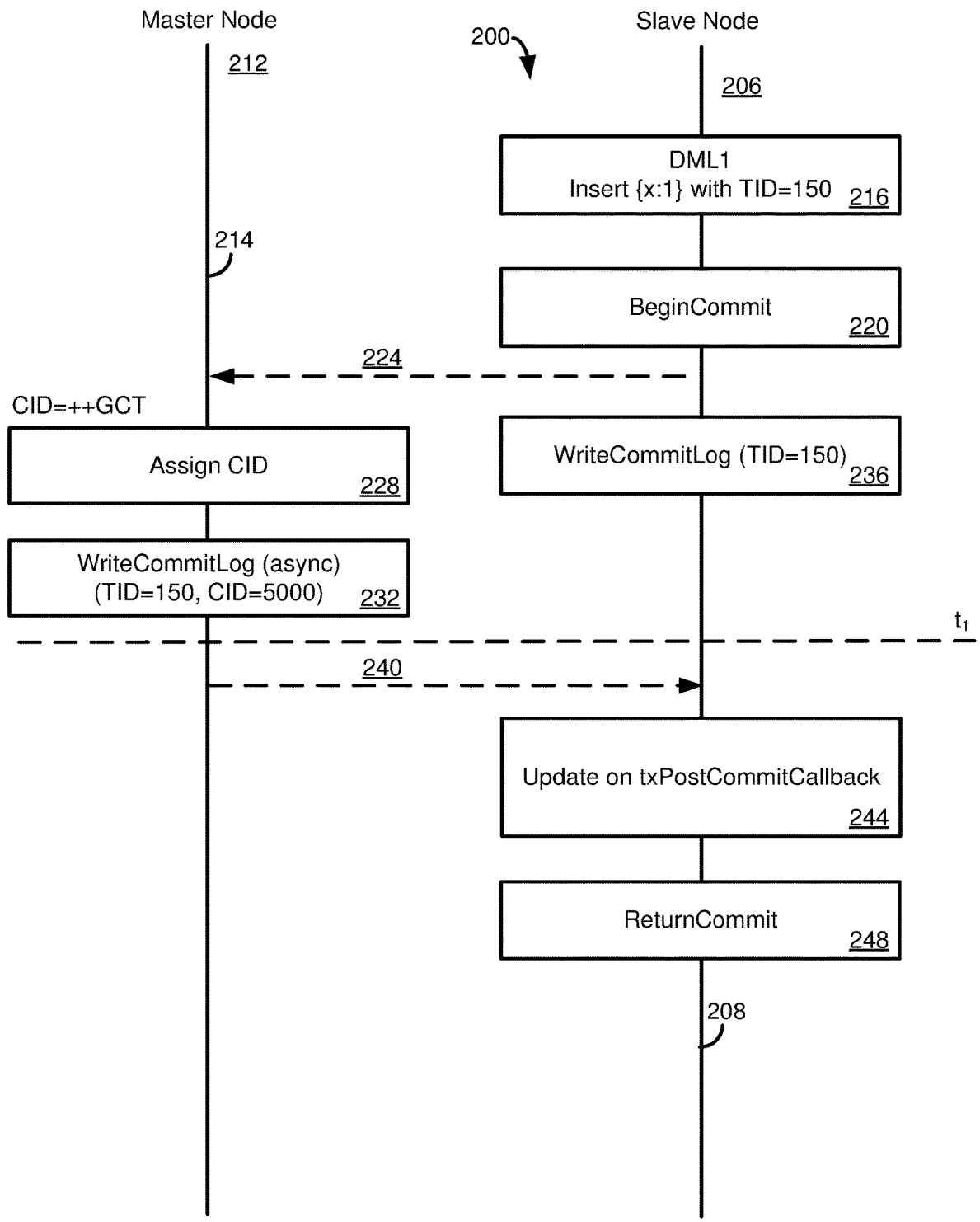
FIG. 2 is a diagram depicting operations occurring at a master node and a slave node during the commit of a database transaction.

FIG. 2 illustrates an example of a commit protocol 200 that can be used to commit a transaction with database operations occurring solely at a slave node 206 in a distributed database system. Although the database operations are carried out at the slave node 206, the commit protocol 200 also involves a master node 212. The slave node 206 and master node 212 have respective execution timelines 208, 214.

In at least some aspects, the master node 212 can coordinate all commits occurring in the database system, including transactions with operations occurring solely at the master node 212, transactions with operations occurring at a single slave node (including solely at the slave node 206), and transactions with operations occurring multiple nodes (e.g., the master node and one or more slave nodes, or at multiple slave nodes). Although involving the master node 212 in the commit of every transaction can increase network traffic, and can delay transaction processing, it can also help provide snapshot monotonicity.

Figure 3:
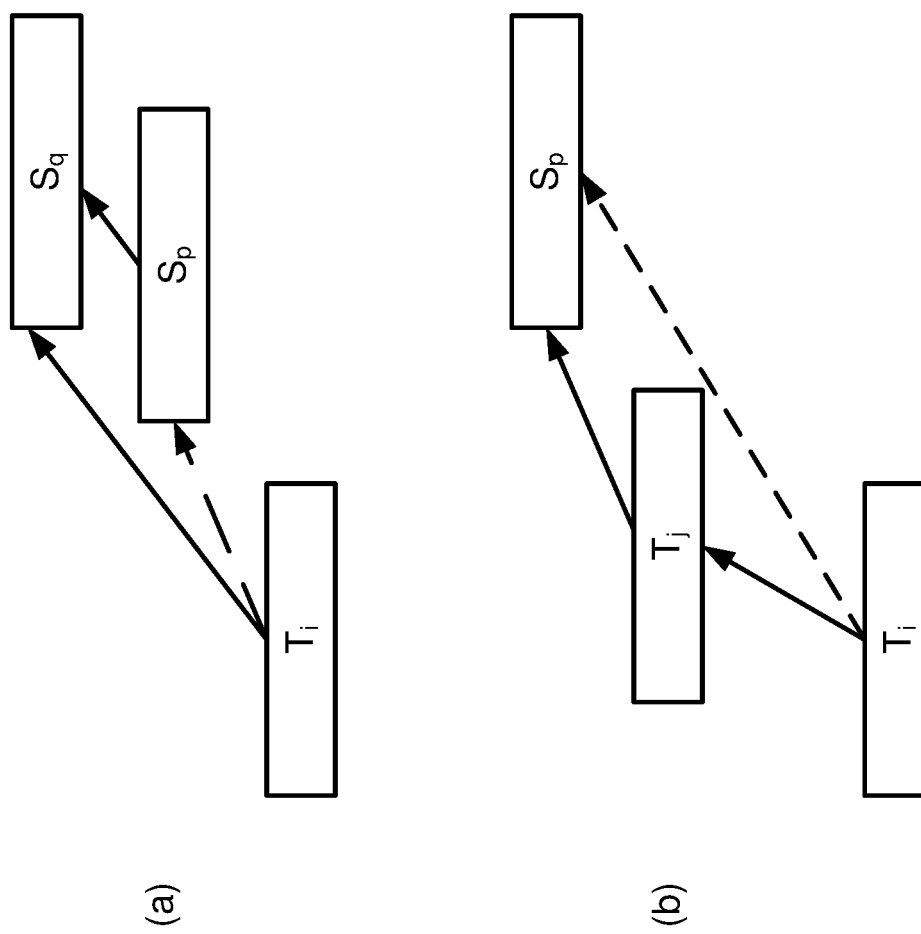
FIG. 3 is a diagram illustrating properties of snapshot monotonicity that may be provided by at least certain implementations of a disclosed distributed transaction protocol with reference to an arbitrary pair of snapshots and an arbitrary pair of write transactions.

According to the principle of snapshot monotonicity, a transaction protocol is said to ensure snapshot monotonicity if all of the following conditions (visually represented in FIG. 3) are met for an arbitrary pair of write transactions, $T_i$ and $T_j$, and an arbitrary pair of snapshots, $S_p$ and $S_q$:

If $T_i$'s changes were visible to $S_q$, and $S_q$ was started after $S_p$'s start, then $T_i$'s changes should be visible to $S_p$ as well (FIG. 3(a)).

If $T_j$'s changes were visible to $S_p$, and $T_j$ committed after $T_i$'s commit, then $T_i$'s changes should be visible to $S_p$ as well (FIG. 3(b)).

Snapshot monotonicity can be used in systems along with ACID (atomicity, consistency, isolation, durability) properties. Snapshot monotonicity is related to snapshot isolation. Additional details regarding snapshot isolation, and protocols for distributed database systems that can provide snapshot monotonicity, are described in U.S. Patent Publication No. US 2016/0371356, incorporated by reference herein in its entirety to the extent not inconsistent with the present disclosure.

Returning to FIG. 2, at 216, a DML statement for a transaction having a transaction identifier (TID) of 150 inserts a value of 1 for a particular database field, x. Although 216 illustrates an INSERT operation, 216 could be another type of DML statement (e.g., an UPDATE or DELETE operation). The commit process begins at 220, such as in response to a commit request from a database client. An asynchronous call 224 is made by the slave node 206 to the master node 212. The call 224 can be used to cause a synchronization token (e.g., a commit timestamp or other identifier, which can be a global commit timestamp or identifier for the database system) to be incremented. A commit ID is assigned to the transaction 150 by the master node 212 at 228. For example, the commit timestamp or identifier of the master node 212 can be incremented, and the incremented commit timestamp or identifier assigned to the transaction 150. An entry for the commit of transaction 150 by the master node 212 can be written asynchronously to a commit log at 232. The commit log entry can include both the transaction identifier (150) and the commit identifier assigned to the transaction (5000).

Concurrently with the commit processing occurring at the master node 212 at 228 and 232, a commit log entry can be written asynchronously to a commit log at the slave node 206 at 236. The commit log entry of the slave node 206 includes the transaction ID (150), and optionally other information, but does not include a commit ID. The commit ID assigned by the master node 212 at 228 can be returned asynchronously to the slave node in communication 240 (e.g., via a callback). In at least some cases, at 244, the commit ID can be associated with a corresponding transaction ID in an in-memory structure of the slave node 206, but it is not persisted. For example, the commit log of the slave node 206 is not updated to include the commit ID. A commit confirmation can be returned, such as to a database client, by the slave node 206 at 248.

While the protocol 200 can provide a number of advantages, such as snapshot monotonicity, issues can arise if the database system is interrupted at time $t_1$, after the commit log entry is written at the slave node 206 at 236, but before the state of the slave node is persisted, such as in a checkpoint or savepoint operation. In this case, when the database system is recovered or restarted, transaction 150 will be noted in the commit log of the slave node 206 as committed, but without the commit ID useable to determine to which database operations the transaction 150 should be visible.

Regarding the resumption of pending database operations on database recovery or restart, if all pending database operations are restarted on database system recovery with a new snapshot timestamp, the transaction 150 can simply be treated as committed (such as by assigning an arbitrarily low commit ID to the transaction, such as a commit ID that is lower than any snapshot timestamp that would be assigned to a database operation to be executed in the recovered database system). However, if pending database operations are restarted or continued with a previously assigned snapshot timestamp, the lack of a commit ID for the transaction 150 could result in inaccurate results or corrupted data.

Regarding restoring a prior state of a database during recovery or restart, such as a point prior to database system interruption, typically one or more saved states of the database system are loaded (e.g., loaded into memory from persistent storage) and then database logs are replayed to finish updating the system. If the saved states and logs are maintained in order, they can be sequentially reloaded or replayed to restore the state of the database system. For instance, in some cases, at least for a particular type of backup, the backup may be represented as a single file that can be read sequentially to restore the state of the database system. In such cases, because of the sequential nature of the files, it may only be important to know whether or not a transaction was committed; the actual commit IDs may no longer be needed.

Some database systems do not maintain persistency stores in order, and the persistency information may be maintained in multiple files, and perhaps on multiple storage media. In such cases, to restore the state of the database system, transaction commit IDs may be needed to order information before it can be reloaded or replayed. If the commit IDs are not available, even for a portion of the transactions, the state of the database system may not be accurately restored, which can lead to corrupted data and inaccurate results.

Example 4—Example Distributed Database System Architecture

Figure 4:
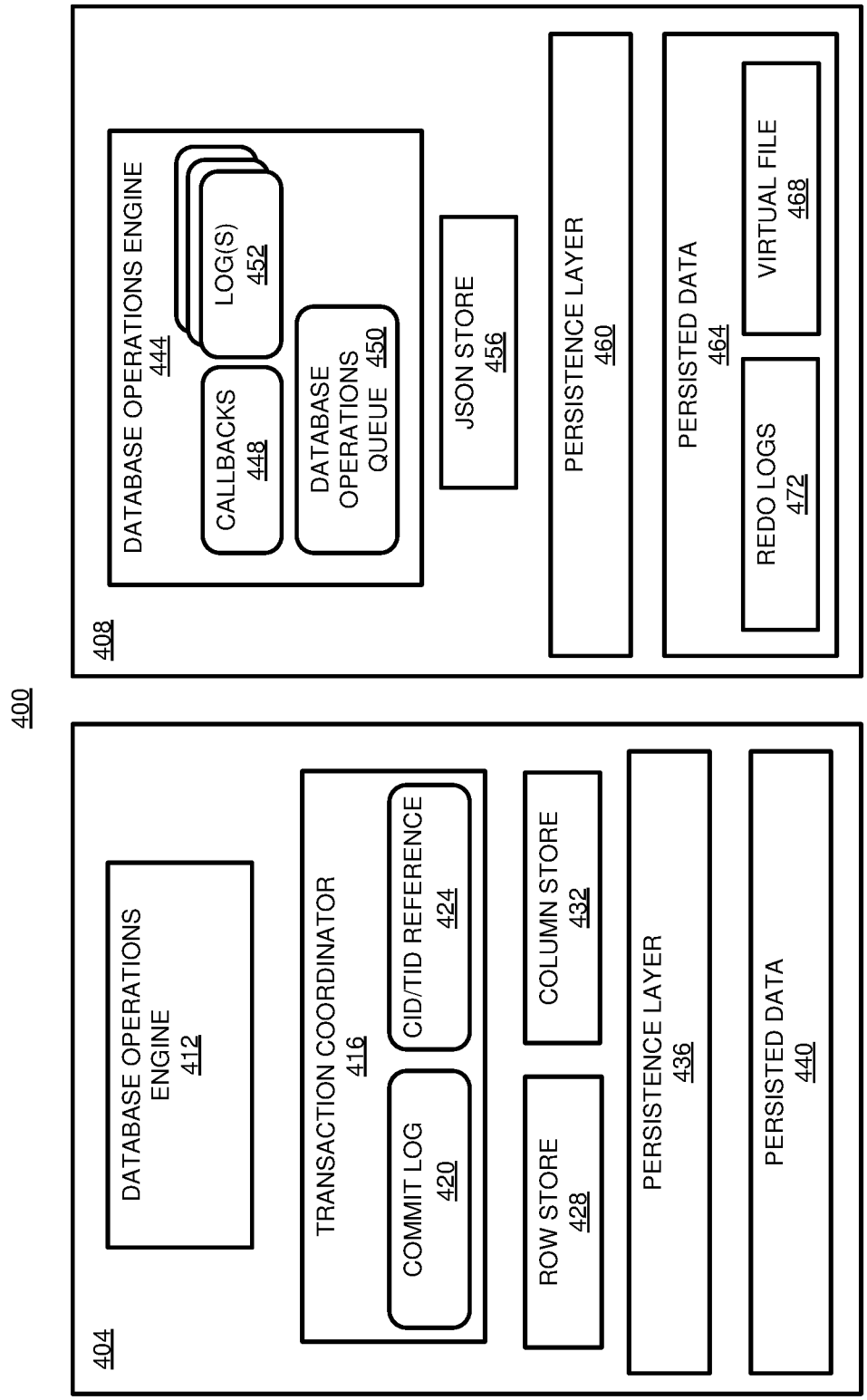
FIG. 4 is a diagram illustrating a distributed database system architecture in which the presently disclosed innovations can be implemented.

FIG. 4 illustrates an example architecture 400 of a database system having a master node 404 and a slave node 408. Although a single slave node 408 is shown, it should be appreciated that the architecture 400 can include multiple slave nodes. In addition, a particular database node may serve as both a slave node and as a master node, such as for different transactions.

The master node 404 can include a database operations engine 412. The database operations engine 412 can receive and process requests for database operations, including queries and DML statements. The master node 404 can also include a transaction coordinator component 416. The transaction coordinator component 416 can manage the commit of database transaction, including metadata associated with committed transactions and, optionally, other metadata. The transaction coordinator component 416 can maintain a commit log 420 that includes commit information for at least a portion of transactions executed on the database system (e.g., transactions where the master node 404 serves as the master node, as well as transactions executed at least in part on the node when it serves as a slave node).

The transaction coordinator component 416 can also include an in-memory commit ID/transaction ID table 424. Although described as a table 424, it should be appreciated that the TID/CID information could be stored in another type of in-memory reference. The in-memory reference can be implemented as a data structure (e.g., a stack, list, queue, heap, tree, graph, and the like). The TID/CID table 424 can maintain a list of transaction IDs and their associated commit IDs for at least a portion of transactions carried on the database system 400, such as transactions for which the master node 404 serves as the master node. The transaction (and their associated commit IDs) maintained in the TID/CID table 424 are typically also further limited, such as to those transaction which have not, or may not yet have, their commit IDs recorded at a slave node (or all or a portion of multiple slave nodes associated with the transaction).

The TID/CID table 424 is typically maintained as an in-memory structure. However, all or a portion of the TID/CID table 424 can be persisted. For example, a current state of the TID/CID table 424 can be periodically persisted. If a database system interruption occurs, on database system recovery or restart, the TID/CID table 424 can be loaded into memory from persistent storage (e.g., hard disk or tape). As will be further explained, maintaining the TID/CID table 424 in-memory can be advantageous when a CID is needed by the slave node 408. For example, although TID/CID information may be stored in the commit log 420, the commit log may be too large to store (such as to continually store) in main memory, or may take excessively long to search for a particular value. Thus, retrieving the commit ID for a particular transaction from the commit log 420 may not be practical. The use of the smaller, in-memory TID/CID table 424 can provide rapid access to the commit ID for a transaction, while conserving system resources.

Database records, including database fields thereof, can be maintained in various formats, including as in-memory structures. For example, the master node 404 can maintain information in a row store (e.g., records are stored sequentially by row) 428 and a column store (e.g., records are stored sequentially by column) 432. Particular types of database operations may be executed more efficiently depending on whether the records are stored in row format versus column format. Typically, relational databases (often used for day-to-day operations, sometimes termed as "write optimized") are processed using the row store 428. However, analytical operations often are more efficiently processed using the column store 432 (sometimes referred to as "read optimized"). Although shown as including both the row store 428 and the column store 432, the architecture 400 can include only the row store 428 or only the column store 432, or can include data stored in other formats in place of, or in addition to, one or both of the row store and the column store. For example, data can be stored in the JavaScript Object Notation (JSON) format or in XML format, which can be described as data being stored in hierarchically organized "documents," which are neither a traditional row nor column store format. Data can also be stored in key-value or graph format.

The master node 404 can include a persistence layer 436, which can manage the transfer of data to and from persisted data 440 stored on a persistent storage medium (e.g., tape or hard disk). The persistence layer 436 can periodically persist (e.g., save) various data and metadata associated with the master node 404, including the contents of the commit log 420, the TID/CID table 424, the row store 428, the column store 432, as well as other operational parameters of the master node 404 or the database system 400. In some cases, all persisted data 440 can be stored on the same medium, while in other cases persisted data 440 can be stored on different media, including storing different types of persisted data on different media. Similarly, the persistence layer 436 can persist all data and metadata in the same manner (e.g., at the same frequency), or can use different schemas to persist different types of data or metadata. For example, the contents of the commit log 420 and the TID/CID table 424 may be persisted more frequently than the contents of the row store 428 or the column store 432.

The master node 404 is in communication with the slave node 408. The slave node 408 can include a database operations engine 444. The database operations engine 444 can process query language statements (e.g., queries or DML statements). The database operations can be received from a database client (not shown), from the master node 404, or from another slave node (not shown). The database operations engine 444 can manage callbacks 448. The callbacks 448 can be used, for example, to return execution results, such as to a database client, the master node 404, or another database system node. Callbacks 448 can also include receiving the results of operations carried out at the master node 404 or other slave nodes of the database system 400.

The database operations engine 444 can include a database operations queue 450. The database operations queue 450 can include requests for database operations that are waiting to be executed or that are currently being executed. Database operations engine 444 can include one or more logs 452. Logs 452 can include a commit log, or a precommit log or other log of pending, uncommitted database operations.

Slave node 408 is shown as including a JSON store 456, which can be an in-memory database structure. However, the slave node 408 can include other types of data stores, in place of, or in addition to, the JSON store 456. Examples of other data stores that can be included in the slave node 408 include XML (or other types of document stores), key-value, graph, row, or column stores. The slave node 408 can include a persistence layer 460 and persisted data 464, which can operate at least generally as described for the master node 404.

For example, the persistence layer 460 can periodically persist (e.g., save) information in the JSON store 456, the logs 452, or other data or metadata of the database operations engine 444 or the slave node 408. In some cases, the persisted data 464 is stored on different storage medium or media than the persisted data 440 of the master node 404. In other cases, a least a portion of the persisted data 464 is stored on the same storage media or medium as the persisted data 440 of the master node 404.

Persisted data, such as persisted data 440 or 464, can be stored in different formats, including depending on the type of data store. For example, in at least some cases, persisted data 440 associated with the row store 428 or the column store 432 can be stored in one or more files, with the data typically being stored such that a prior state of the relevant node (e.g., master node 404) can be restored by sequentially replaying the persisted data. In some cases, a particular backup can be stored in a single file that can be sequentially read to reload or replay database operations.

Other types of data, such as persisted JSON data associated with the JSON store 456, can be stored in a different manner than the row store 428 or the column store 432. For example, changes to the JSON store 456 can be written to a virtual file 468. The virtual file 468 can include transaction identifiers for entries (e.g., entries related to the changes) written to the virtual file. Changes can also be logged in redo logs 472. Redo logs 472 can include multiple, interrelated files that can be processed to generate contents for the virtual file 468. However, because the redo logs 472 may not be sequential, and may be stored in multiple files, information regarding the persisted transactions, such as their commit IDs may be needed to correctly reproduce (such as by ordering the transactions) a prior state of the JSON store 456 and a corresponding virtual file 468. In contrast, such information may not be needed to reload the row store 428 or column store 432 from the persisted data 440.

Example 5—Example Hierarchical Document Format

Figure 5:
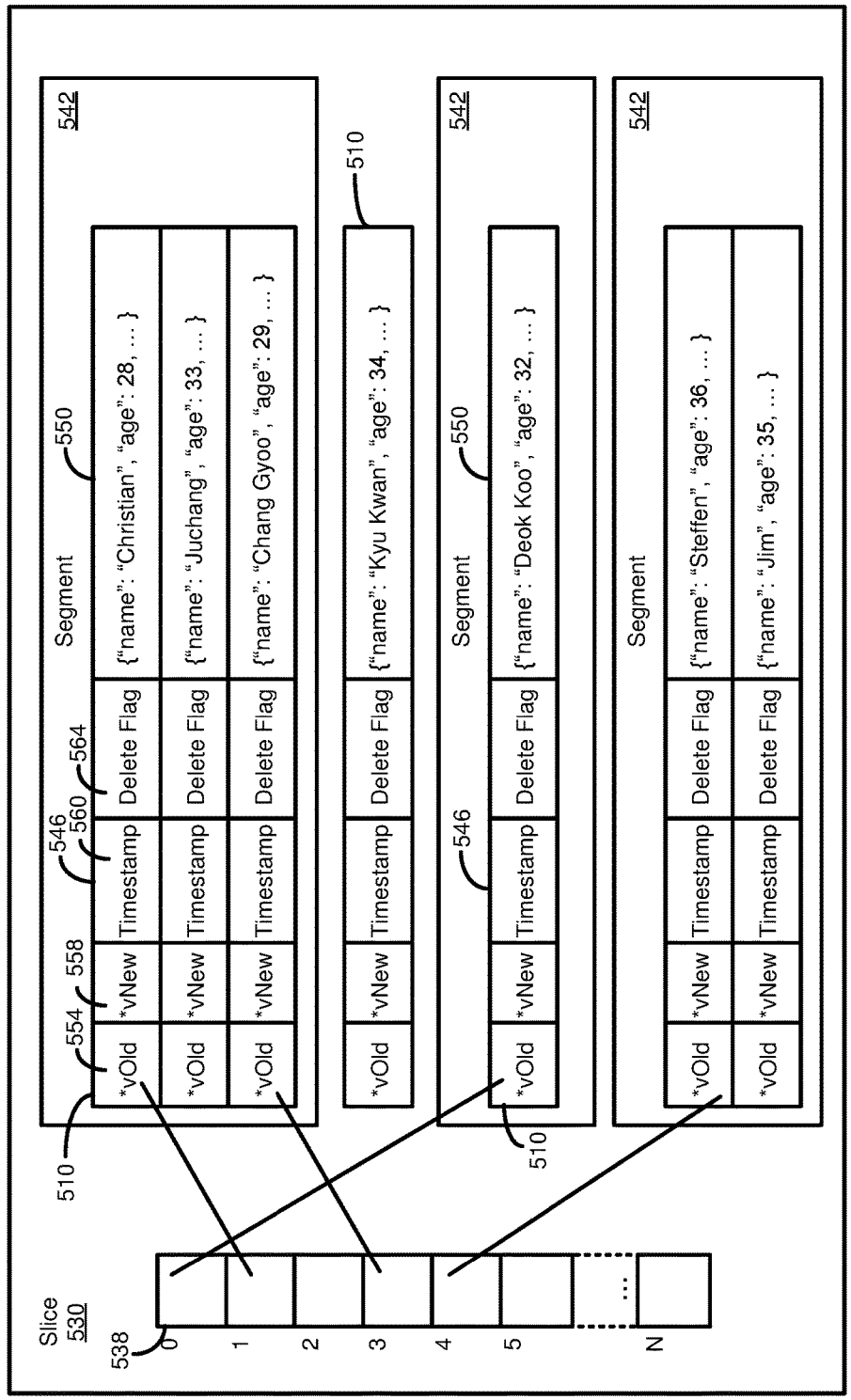
FIG. 5 is a diagram illustrating a hierarchical organization of documents of a database system.

FIG. 5 schematically depicts how information may be stored in a database system, such as in the JSON store 456 of the slave node 408 of FIG. 4. A plurality of JSON documents 510 can be organized hierarchically. At the apex of the hierarchy, the documents 510 can be stored in one or more collections 514 (although a single collection is shown). In turn, a collection 514 can be organized into one or more partitions 518. The organization of the partitions 518 can be specified in a partition specification 522.

Each partition 518 can be associated with a particular identifier 526 and can be further organized into one or more slices 530. Each slice 530 can be associated with an index 534 to assist in more quickly locating data within a slice. Each slice 530 can include a vector 538 that stores a pointer to a particular document 510 or to a segment 542 of the slice. A segment 542 can include one or more documents 510 (and is at least capable of storing multiple documents). Each document 510 in a segment 542 can be associated with a different pointer of the vector 538.

A document 510 may include a header 546 and document data 550. The header 546 can include metadata associated with the document 510. In some cases, a database system can provide for versioning of documents 510. For example, when a document 510 is updated or deleted, the changes can be implemented by creating a new version of the document. The documents 510 can be linked, such as when changes are to be rolled back, or when multiple versions of the document are to be analyzed to determine a correct version to be retrieved (such as based on a snapshot timestamp associated with a database system operating associated with the document).

The document header 546 can include a pointer 554, vOld, to a prior document version, and a pointer 558, vNew, to a subsequent document version. The document header 546 can include an identifier 560 associated with when a document 510 was created. For example, a document 510 can represent a database transaction, and the identifier 560 can be a commit ID. The document header 546 can include other metadata, including a delete flag 564 that can be used to indicate when a document 510 has been marked as deleted in the database system. Typically, when the delete flag 564 is set to TRUE, the document data 550 for the document 510 is not present. In addition, the pointer 554 to the prior version of the document 510 can be deleted (e.g., set to NULL), as well has having the pointer 558 for the subsequent version of the document set to NULL (or otherwise set to indicate that no subsequent version of the document exists).

Documents 510 that do not have the delete flag 564 set to true include document data 550, which is shown in JSON format. In some cases, a data store can be organized as shown in FIG. 5, but the document data 550 can be stored in a different format, such as XML.

Figure 6:
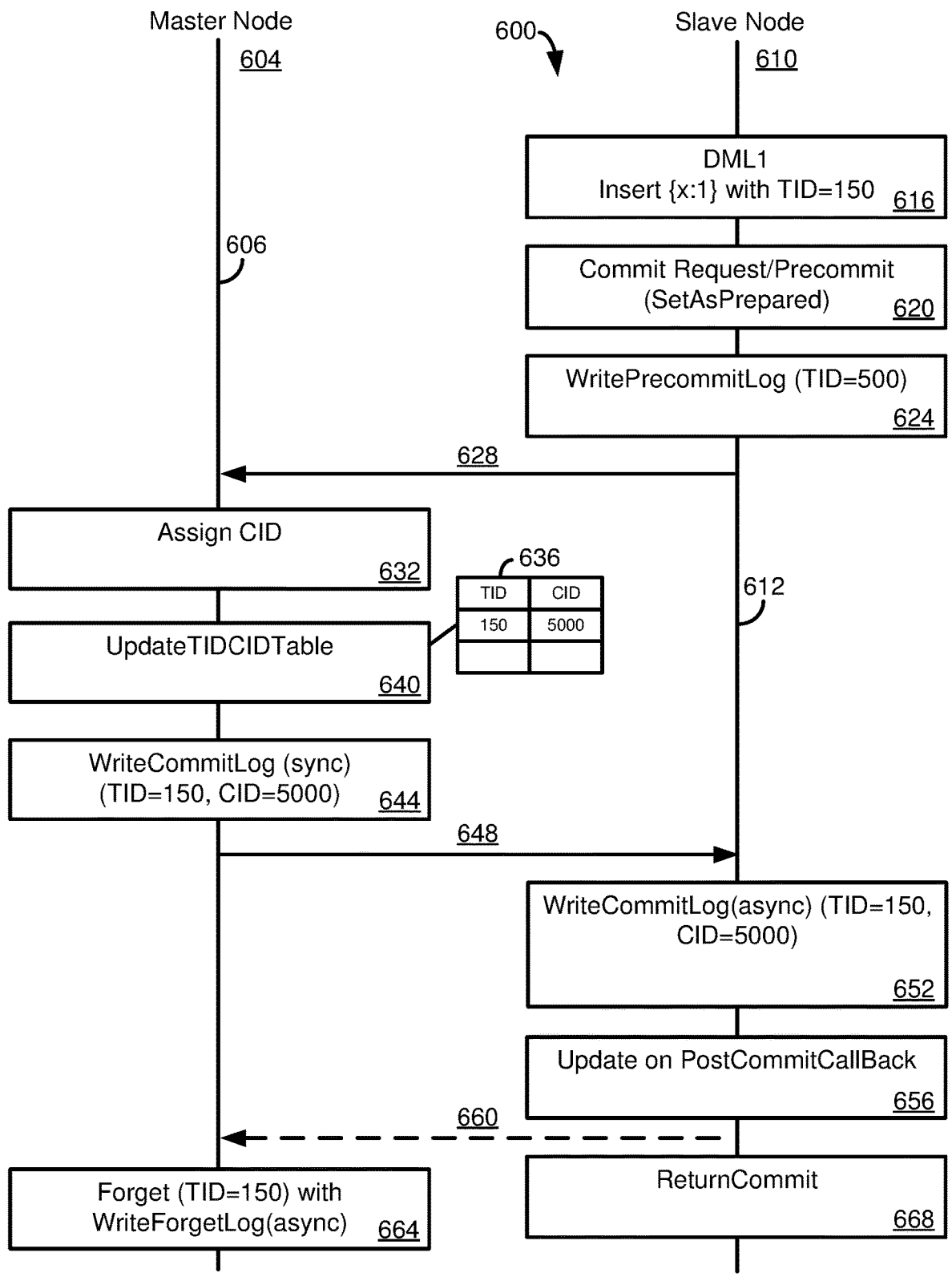
FIG. 6 is a diagram depicting operations occurring at a master node and a slave node according to a disclosed commit protocol involving an in-memory commit identifier reference maintained by the master node and the writing of a precommit log entry by the slave node.

Example 6—Example Commit Protocol with in-Memory Commit Identifier Reference and Slave Precommit Log FIG. 6 illustrates an example database system commit protocol 600 according to the present disclosure. The protocol 600 describes operations occurring at a master node 604 and a slave node 610, having respective execution timelines 606, 612. Although a single slave node 610 is shown, a database system implementing the commit protocol 600 can include a plurality of slave nodes.

At 616, DML1 is executed at the slave node 610. DML1 inserts a value of 1 for a particular database field x. DML1 is associated with a transaction having an ID of 150. Although transaction 150 is shown as including a single DML statement, transactions processed according to the protocol 600 can include a plurality of DML statements. The commit process begins at 620. In some cases, 620 can include marking transaction 150 as having begun the commit process. For example, transaction 150 can be designated as "precommitted" using a SetAsPrepared operation. Setting a transaction as precommitted can assist in determining whether the transaction should be visible to other database operations. Transaction 150 can be written as an entry to a log, such as precommit log, at 624. In at least some implementations, the commit log entry written at 624 can include the transaction ID (150) of the transaction associated with the log entry.

A synchronous call 628 is made by the slave node 610 to the master node 604. The call 628 can be used to cause a synchronization token (e.g., a commit timestamp or other identifier, which can be a global commit timestamp or identifier for the database system) to be incremented. A commit ID, 5000, is assigned to the transaction 150 by the master node 604 at 632. For example, the commit timestamp or identifier of the master node 604 can be incremented, and the incremented commit timestamp or identifier assigned to the transaction 150. The commit of transaction 150 by the master node 604 can recorded in an in-memory TID/CID table 636 (or other in-memory reference) at 640. The TID/CID table 636 includes the transaction ID, 150, and the commit ID, 5000, assigned to the transaction by the master node 604 at 632. At 644, a commit log entry is written synchronously at the master node 604. The commit log entry can include the transaction ID, 150, and the commit ID, 5000, assigned to the transaction by the master node 604 at 632.

Although shown as occurring prior to updating the TID/CID table 636 at 640, in other implementations of the protocol 600, writing the commit log entry at 644 can occur prior to updating the table 636 at 640. Or, writing of the commit log at 644 and updating the TID/CID table 636 at 640 can occur concurrently. However, typically, writing the commit log entry at 644 occurs after the TID/CID table 636 is successfully updated at 640. If the commit log entry 644 is written, and the database system is interrupted before the TID/CID table 636 is updated at 640, a transaction at the slave node 610 will not be able to recover its commit ID, even though the transaction is recorded in the commit log of the master node 604.

After the TID/CID table 636 is updated at 640 and the commit log entry written at 644, the commit ID for transaction 150 can be sent to the slave node 610 in synchronous communication 648. A commit log entry for transaction 150 can be written asynchronously at the slave node 610 at 652. In at least some implementations, the commit log entry can include the transaction ID and the commit ID assigned to the transaction by the master node 604 at 632.

As discussed above, an advantage of maintaining the TID/CID table 636 is that the commit ID for a transaction can be quickly accessed from the table, such as during database recovery or restart. However, if entries are solely added to the TID/CID table 636, eventually the table may become too large to maintain in-memory, or to quickly search (e.g., the table would essentially duplicate the commit log). In order to maintain the TID/CID table 636 at a size that can be practically maintained in-memory and quickly searched, entries can be periodically removed from the table 636, such as in a garbage collection process. Entries can be removed from the table 636 using various algorithms or schemes. For example, the slave node 610 can periodically communicate with the master node 604 regarding the last committed transaction reflected in the commit log of the slave node 606. After receiving this communication, the master node 604 can remove from the table 636 entries having a commit ID less than or equal to this value.

In another implementation, with reference again to FIG. 6, the slave node 610 can execute a callback at 656, causing the transaction ID (or, optionally, commit ID), of the transaction committed by the slave node at 652 to be sent to the master node 604 by the slave node in asynchronous communication 660. After receiving the communication 660, at 664, the master node 604 can remove the entry corresponding to the transaction identified in communication 660 from the TID/CID table 636, such as by executing a WriteForgetLog method. In addition to removing the entry from the table 636, the master node 604 can write an entry to a log (e.g., a "forget log") indicating that the transaction can be removed from the table. If logs are replayed at the master node 604, the forget log entry can ensure that table entries are appropriately removed, preventing the table 636 from reaching an excessive size.

As shown in FIG. 6, after sending the communication 660, the slave node 610 can return a commit notification, such as to a database client, at 668. In other implementations, the return commit operation 668 can occur at another time subsequent to successful writing of the commit log entry at 652.

Figure 7:
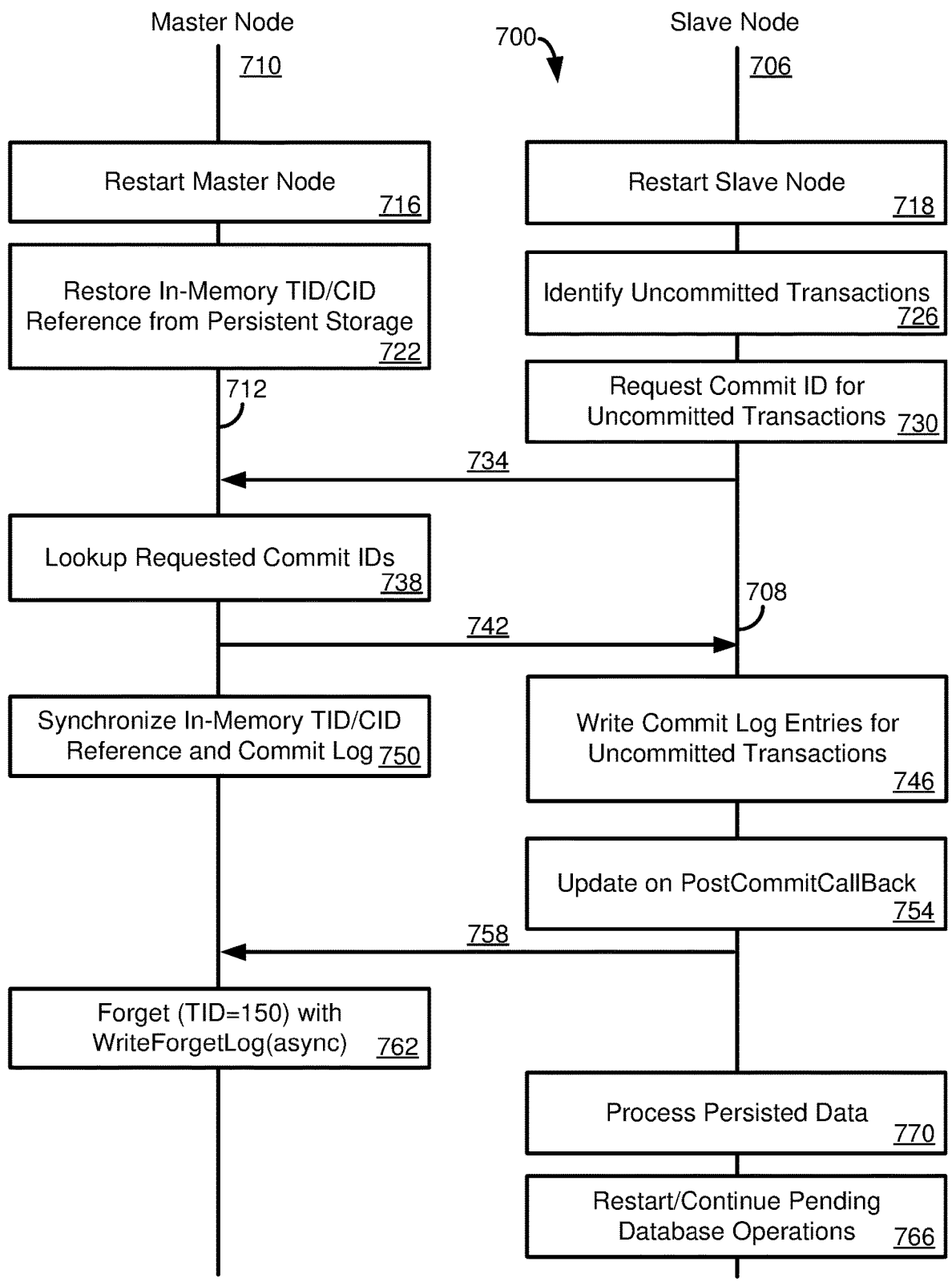
FIG. 7 is a diagram depicting operations occurring at a master node and a slave node during database system recovery or restart where the slave node can request commit identifiers for transactions from an in-memory reference maintained by the master node.

Example 7—Example Recovery of Commit Identifier by Slave Node from in-Memory Reference of Master Node FIG. 7 illustrates a scenario 700 by which a slave node 706 can recover commit IDs for transactions from a master node 710 during database system recovery or restart. The slave node 706 and master node 710 have respective execution timelines 708, 712. At 716, 718, the master node 710 and the slave node 706, respectively are restarted.

After the master node 710 is restarted, at 722, an in-memory TID/CID reference (e.g., a table or representation of the information, including in a data structure) can be restored from persistent storage. At 726, the slave node 706 determines uncommitted transactions, which, in various implementations can be in-doubt transactions (e.g., transactions which have begun the commit process but whose final commit status is not known by the slave node 706) or can be open transactions (transactions that have not begun the commit process, and, in some cases, in-doubt transactions). The slave node 706, at 730, sends a request 734 to the master node 710 for the commit status, including the commit ID for committed transactions, for the uncommitted transactions identified at 726.

At 738, the master node 710 looks up the commit IDs for transactions in request 730 the TID/CID reference. The commit IDs for committed transactions are returned by the master node 710 to the slave node 706 in communication 742. In some cases, the slave node 706 can mark any transactions whose commit status was not known by the slave node, and for which a commit ID was not received in the communication 742, as aborted transactions. Or, if sufficient information exists, the commit of an uncommitted transaction can be continued or restarted.

For uncommitted transactions for which a commit ID was returned in communication 742, at 746, commit log entries can be written at the slave node 706. Although not shown in FIG. 7, the scenario 700 can include other features. For example, in addition to, or in place of, writing commit log entries at 746, the commit IDs can be associated with their corresponding transaction IDs in an in-memory structure or in another persisted state.

The master node 710 can use the restored in-memory TID/CID reference for purposes other than responding to the request 734. For example, in some cases, the database system may have crashed after the TID/CID reference was persisted, but before the commit log entry was written. In such a case, the TID/CID reference can include committed transactions that are not reflected in the commit log. At 750, the master node 710 can synchronize the TID/CID reference and the commit log, writing to the commit log entries for any committed transactions that are present in the TID/CID reference, but not the commit log.

After the slave node 706 has written commit log entries for any transactions for which a commit ID was received in communication 742, at 754, the slave node can send a communication 758 to the master node 706 identifying such transactions, such as using a post commit callback operation. The master node 710 can remove those transactions, and their corresponding commit IDs, from the TID/CID reference at 762. At 766, the slave node 706 can restart or continue database operations that were pending at the time of the database system interruption, including using snapshot timestamps originally assigned to the database operations.

The commit IDs, including as written in the log entries at 746, or to the in-memory structures, can be used for other purposes at the slave node 706, such as to process or modify other types of persisted information about the slave node 706, including replay files useable to restore the slave node to a state before the database system was interrupted, such as at 770. In particular, in some cases, information needed to repopulate an in-memory database system structure to restore the database system structure to a pre-interruption state, such as the JSON store 456 of FIG. 4, may be stored in multiple files. The files may be interdependent, such that data in the files needs to be ordered, such as by commit ID. Without the ability to retrieve the commit IDs for in-doubt transactions (or transactions whose commit status is otherwise unknown to the slave node 706) provided by the present disclosure, at least certain transactions may not be properly restored, which could lead to erroneous results or corrupted data.

Example 8—Example Commit Protocol with in-Memory Commit Identifier Reference and Slave Precommit Log for Multi-Node Transactions FIG. 6 depicts, and Example 6 describes, the commit of a transaction executed at a single slave node. However, the present disclosure provides embodiments of a commit protocol that can be used with distributed transactions have database operations (e.g., DML statements) affecting multiple nodes (include a master node and one or more slave nodes, or multiple slave nodes, where the commit is mediated by the master node). An example distributed transaction protocol 800 is depicted in FIG. 8.

Figure 8:
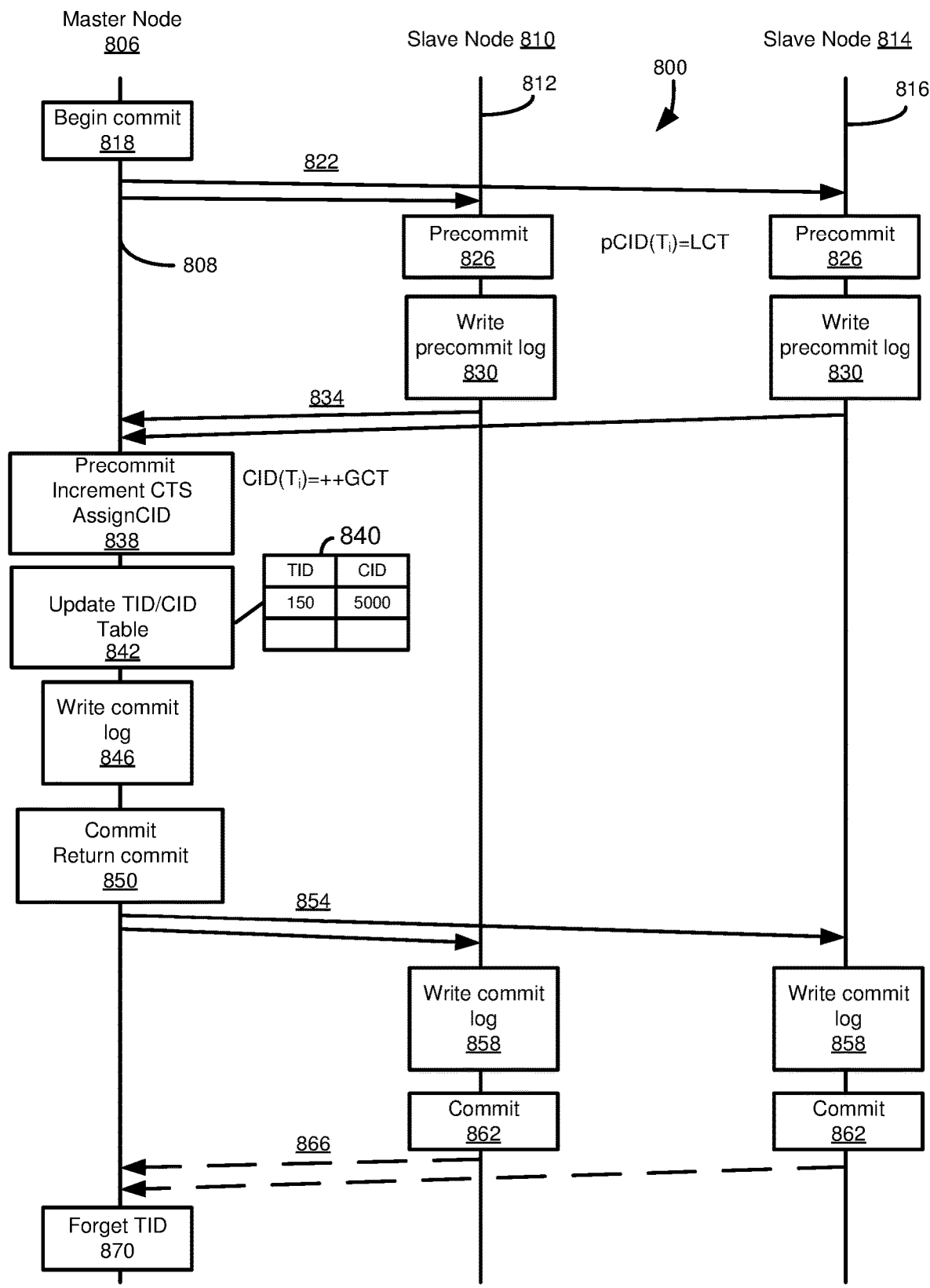
FIG. 8 is a diagram depicting operations occurring at a master node and first and second slave nodes according to a disclosed commit protocol for distributed database transactions, the protocol using an in-memory commit identifier reference maintained by the master node.

FIG. 8 includes a master node 806 and first and second slave nodes 810, 814, having respective execution timelines 808, 812, 816. In some cases, the slave nodes 810, 814 can be configured similarly, such as including the same type(s) of data stores (e.g., row, column, document). In other cases, the slave nodes 810, 814 can be configured differently, such as one slave node including a type of data store not included by the other node. Correspondingly, in some cases, the commit protocols used by the slave nodes 810, 814 can be identical, while in other cases the commit protocols may be different.

In a multi-node transaction, the commit is typically coordinated or mediated by the master node 806. The master node 806 begins the commit process at 818 by sending a precommit request 822 to the slave nodes 810, 814. In response, the slave nodes 810, 814 precommit the transaction at 826. Precommitting the transaction can include marking the transaction as precommitted (e.g., having begun the commit process), and writing a precommit log entry at 830. The precommit log entry can include various information, including the DML statements associated with the transaction (or, at least the DML statements associated with the transaction that were executable at the respective slave node 810, 814) and the transaction ID for the transaction.

In some cases, a precommit ID can be assigned to the transaction by a slave node 810, 814. The precommit ID can be used, for example, in a delayed transaction visibility determination scheme, where the determination of whether an in-doubt transaction is visible is delayed, such as until the in-doubt transaction is committed or aborted. The slave node 810, 814 can maintain a local commit timestamp that is synchronized with the master node 806 upon the commit of a transaction involving the worker node. As explained above, for different transactions, different nodes can serve as the master node.

The slave nodes 810, 814 send a precommit acknowledgement to the master node 806 in synchronous communications 834. After receiving the precommit acknowledgments 834, at 838, the master node 806 marks the transaction as precommitted, increments its commit timestamp (which can be a global commit timestamp) and assigns the incremented commit timestamp to the transaction as its commit ID. The master node 806 updates an in-memory TID/CID table 840 (or other in-memory reference) at 842. After updating the TID/CID table 840 at 842, the master node 806 synchronously writes a commit log entry for the transaction at 846. The master node 806 marks the transaction as committed at 850, and returns a commit notification, such as to a database client. The commit ID for the transaction can then be sent synchronously to the slave nodes 810, 814 in communication 854. The slave nodes 810, 814 asynchronously write commit log entries for the transaction at 858, and mark the transactions as committed at 862.

The slave nodes 810, 814 asynchronously send a post commit notification 866, such as via a callback, to the master node 806. The post commit notification 866 indicates to the master node 806 that the commit log entries have been successfully written at the slave nodes 810, 814, and so the TID/CID entry for the transaction can be removed from the in-memory table by the master node at 870. In addition to removing the entry from the table 840, the master node 806 can write an entry to a log (e.g., a "forget log") indicating that the transaction can be removed from the table. If logs are replayed at the master node 806, the forget log entry can ensure that table entries are appropriately removed, preventing the table 840 from reaching an excessive size.

Figure 9:
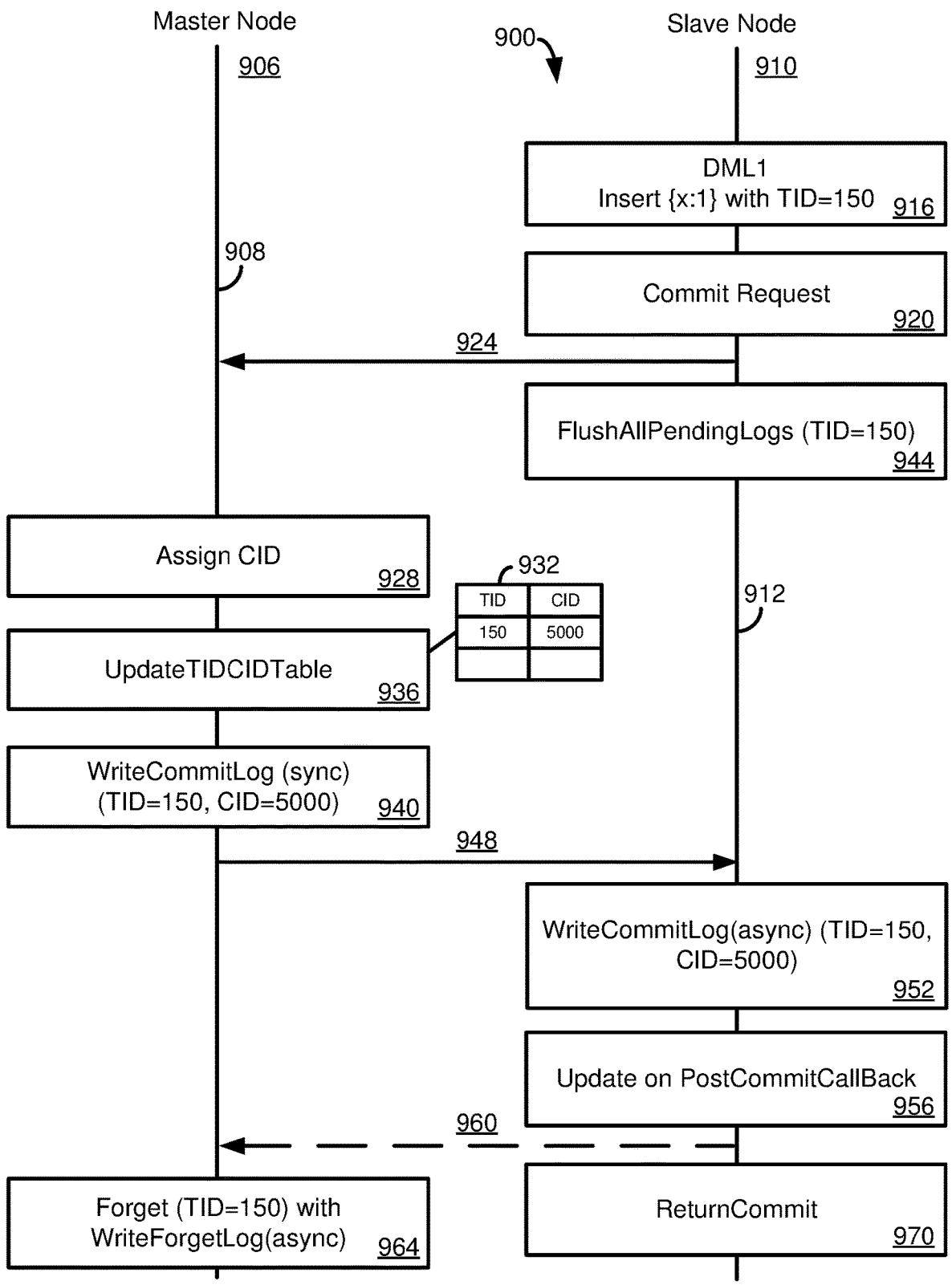
FIG. 9 is a diagram depicting operations occurring at a master node and a slave node according to a disclosed commit protocol involving an in-memory commit identifier reference maintained by the master node and without the writing of a precommit log entry by the slave node.

Example 9—Example Commit Protocol with in-Memory Commit Identifier Reference and without Slave Precommit Log The protocol 600 of FIG. 6 advantageously facilitate access to the commit ID of a transaction if a database system is interrupted before the commit ID is received by a slave node and written to its commit log. However, compared with the protocol 200 of FIG. 2, database performance can be reduced, as additional disk operations are involved in writing the precommit log entry at the slave node. FIG. 9 illustrates a protocol 900 that also facilitates access to the commit ID of a transaction if the database system is interrupted prior to the writing of a commit log entry by the slave node, but does not require the writing of a precommit log entry.

The protocol 900 illustrates operations occurring at a master node 906 and a slave node 910, having respective execution timelines 908, 912. At 916, a first DML statement is carried out, such as a statement associated with a transaction having a transaction ID of 150 inserting a value of 1 for a field x. A commit request is received by the slave node 910, such as from a database client at 920.

A synchronous call 924 is made by the slave node 910 to the master node 906. The call 924 can be used to cause a synchronization token (e.g., a commit timestamp or other identifier, which can be a global commit timestamp or identifier for the database system) to be incremented. The call 924 can include the transaction ID and, optionally, other information associated with the transaction, such as a log position associated with the slave node 910 (e.g., the last log position associated with the transaction being committed). A commit ID, 5000, is assigned to the transaction 150 by the master node 906 at 928. For example, the commit timestamp or identifier of the master node 906 can be incremented, and the incremented commit timestamp or identifier assigned to the transaction 150. The commit of transaction 150 by the master node 906, along with the slave log position received in the call 924, can be recorded in an in-memory TID/CID table (or other in-memory reference) 932 at 936. The TID/CID table 932 includes the transaction ID, 150, and the commit ID, 5000, assigned to the transaction by the master node 906 at 928. At 940, a commit log entry is synchronously written at the master node 906. The commit log entry can include the transaction ID, 150, and the commit ID, 5000, assigned to the transaction by the master node 906 at 928. Although shown as occurring prior to updating the TID/CID table 932 at 936, in other implementations of the protocol 900, writing the commit log entry at 940 can occur prior to updating the table 932 at 936. Or, writing of the commit log at 940 and updating the TID/CID table 932 at 936 can occur concurrently. However, typically, writing the commit log entry at 940 occurs after the TID/CID table 932 is successfully updated at 936. If the commit log entry is written at 940, and the database system is interrupted before the TID/CID table 932 is updated at 936, a transaction at the slave node 910 will not be able to recover its commit ID, even though the transaction is recorded in the commit log of the master node 906.

While the master node 906 is carrying out 928, 936, and 940, at 944, the slave node 910 can flush its pending logs associated with the transaction being committed, such as flushing the logs to persistent storage. The log entry or entries can include the transaction ID, a log position, and, at least in some cases, the DML statements associated with the transaction and, optionally, other information. Flushing the transaction logs can provide an indication that the commit of the transaction was initiated. In addition, the transaction logs can be used to determine whether the transaction can be committed during database system recovery or restart, as further described below. Although 944 can also involve disk operations, these operations can be overlapped with activities at the master node (e.g., 928, 926, 940), and thus the performance penalty of the disk I/O is reduced or eliminated compared with the protocol 600, where the master node does not begin its operation until the persistency operations associated with the transaction precommit have completed.

After the TID/CID table 932 is updated at 936, and the commit log entry written at 940, the commit ID for transaction 150 can be sent to the slave node 910 in synchronous communication 948. A commit log entry for transaction 150 can be written asynchronously at the slave node 910 at 952. In at least some implementations, the commit log entry can include the transaction ID and the commit ID assigned to the transaction by the master node 906 at 928.

At 956, the slave node 910 can issue an asynchronous post commit notification 960 to the master node 906, such as via a callback. The notification 960 can be used to provide an indication to the master node 906 that the transaction identified in the communication has been successfully written to a write log at the slave node, and thus can be removed from the TID/CID table at 964. In addition to removing the entry from the table 932, the master node 906 can write an entry to a log (e.g., a "forget log") indicating that the transaction can be removed from the table. If logs are replayed at the master node 906, the forget log entry can ensure that table entries are appropriately removed, preventing the table 932 from reaching an excessive size.

The slave node 910 can return a commit notification, such as to a database client, at 970. Although 970 is shown as occurring after 956 and 964, in other cases, 970 can occur prior to, or concurrently with 956 or 964.

If the database system is interrupted, the commit status of transactions at the slave node, can be determined by querying the master node 906, such as described in conjunction with FIG. 7. As the protocol 900 does not generate a precommit log entry at the slave node 910, the TID/CID table 932 can be used to decide the commit status of all open transactions (e.g., transactions, generally, whose commit status is not known by the slave node), not just in doubt transactions (transactions which have begun, but not completed, the commit process). If the transaction ID is in the table 932, it can be marked as committed. If the transaction ID is not in the table 932, it can be marked as aborted.

However, this use of the TID/CID table 932 can result in a transaction being marked as committed, because its transaction ID is in the table, even though the transaction is not recorded as committed in the write logs of either the master node 906 or the slave node 910. To resolve this issue, the update of the TID/CID table at 936 and the writing of the commit log at 940 can be made atomic with respect to persistency (e.g., checkpoint or savepoint) operations. When the TID/CID table update of 936 begins, a lock can be acquired that prevents persistency operations involving the TID/CID table 932 and write log from executing until the commit log has finished writing at 940, at which point the lock is released and the persistency operations can proceed. It should be noted that the lock can be made effective against persistency operations, but not against commit operations for other transactions. That is, multiple transactions can execute 936 and 940 concurrently, with persistency operations able to proceed as long as no transaction holds the lock. Although described with respect to the protocol 900, this feature can, if desired, be included in the protocol 600 of Example 6 or the protocol 800 of Example 8. In addition, rather than including the lock feature, if a transaction is present in the TID/CID table 932, but not in the commit log of the master node 906, the commit protocol 900 can include writing a commit log entry for the transaction.

Example 10—Example Operations at Master and Slave Nodes

Figure 10:
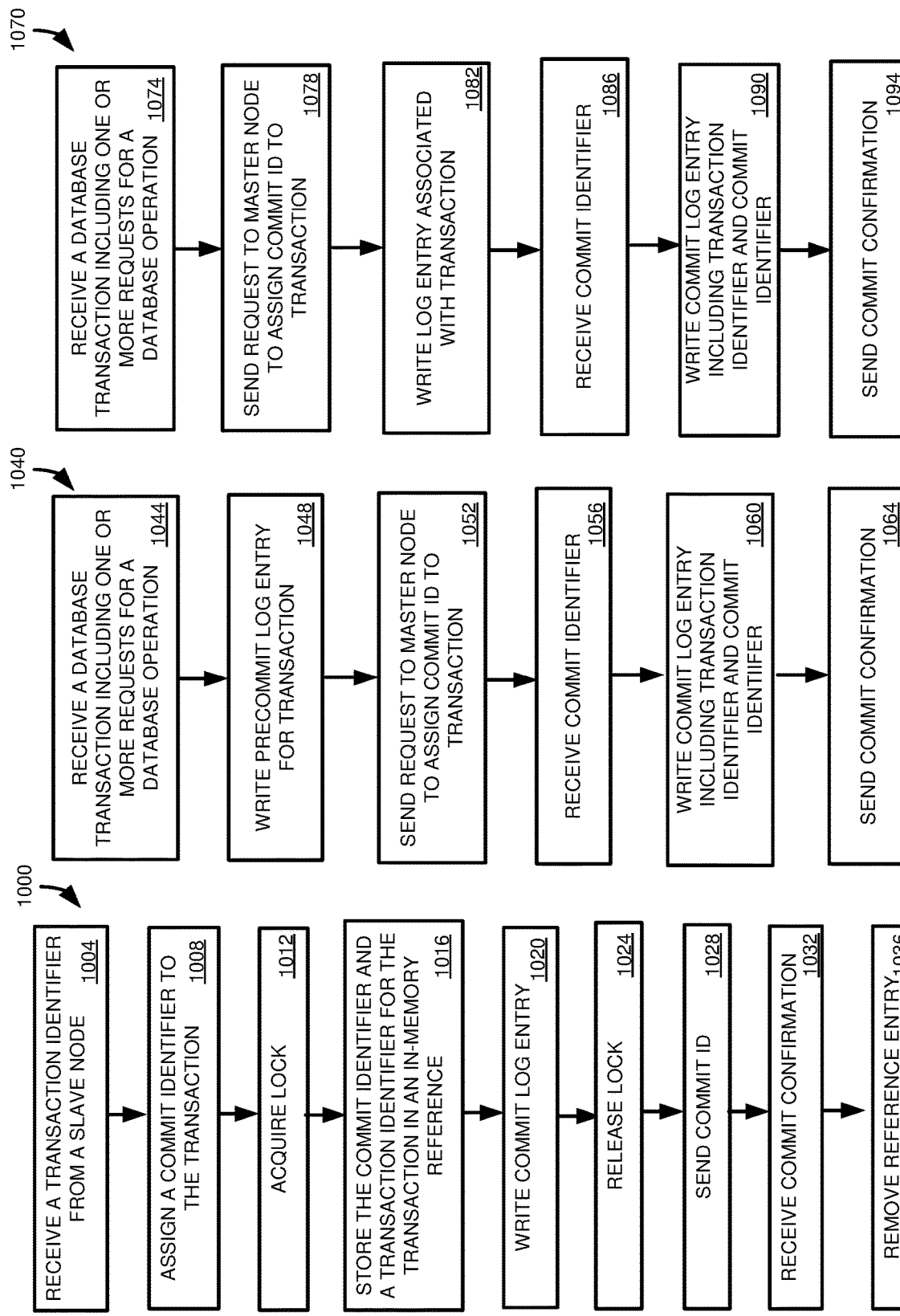
FIG. 10A is a flowchart of a method including operations occurring at a master node for a transaction commit protocol using an in-memory commit identifier reference maintained by the master node.
FIG. 10B is a flowchart of a method including operations occurring at a slave node for a transaction commit protocol using an in-memory commit identifier reference maintained by the master node and the writing of a precommit log entry by the slave node.
FIG. 10C is a flowchart of a method including operations occurring at a slave node for a transaction commit protocol using an in-memory commit identifier reference maintained by the master node and without the writing of a precommit log entry by the slave node.

FIGS. 10A-10C depict operations occurring at a master node (FIG. 10A) and slave nodes (FIGS. 10B and 10C)

according to various aspects of the present disclosure. FIG. 10A illustrates a method 1000 that includes actions occurring at a master node. The method 1000 can be part of a transaction commit protocol for a distributed database system.

At 1004, a transaction identifier is received from a slave node. The transaction identifier may be received in conjunction with a request by the slave node to commit the transaction associated with the transaction identifier. The master node may receive additional information from the slave node, such as a position of a log maintained by the slave node that is associated with the transaction. At 1008, the master node assigns a commit identifier (such as an integer or time value) to the transaction associated with the transaction identifier. For example, the master node can maintain a global commit identifier that can be used to identify different states of the database system. The global commit identifier can be incremented and assigned to the transaction at 1008.

The transaction identifier and its assigned commit identifier are stored in an in-memory reference (e.g., a table or other reference, including implemented in a data structure) at 1016. In some cases, additional information can be stored in the in-memory reference, such as a log position of the slave node that is associated with the transaction. The in-memory reference can, and typically does, maintain mappings of transaction identifiers and commit identifiers for a plurality of transactions (e.g., in at least some implementations, the in-memory reference can be equivalent to a table having multiple rows, each row associated with a particular transaction).

A commit log entry is written by the master node at 1020. The commit log entry can include the transaction identifier and the commit identifier assigned at 1008. The commit log entry can include additional information, such as a slave log position associated with the transaction.

The commit log and the in-memory reference can be periodically persisted. In some cases, a persistence operation can occur at any time during the method 1000. In at least some implementations of the method 1000, it can be beneficial to carry out 1016 and 1020 atomically with respect to persistence operations for the commit log and in-memory reference. Accordingly, in some aspects, a lock can be acquired at 1012, prior to storing the commit identifier and transaction identifier in the in-memory reference. The lock can be released at 1024, after the commit log entry has been written at 1020. The lock is typically effective against persistence operations, but does not prevent concurrent access to the in-memory reference or the commit log by other transactions.

At 1028, after writing the commit log entry at 1020, or releasing the lock at 1024, the commit identifier is sent to the slave node. In at least some implementations, the slave node can send a notification to the master node that slave node no longer needs the master node to maintain the commit ID in the in-memory reference. For example, the slave node may have written the commit ID to a commit log. The master node receives a commit confirmation from the slave node at 1032. At 1036, the entry in the in-memory reference for the transaction indicated at 1032 is removed. Optionally, a log entry for such removal can be written at the master node.

FIG. 10B illustrates operations occurring at a slave node according to a method 1040 implementing a commit protocol according to an embodiment of the present disclosure. At 1044, the slave node receives a database transaction including one or more requests for a database operation (e.g., DML statements). The slave node writes a precommit log entry for the transaction at 1048, such as in response to a request to commit the transaction (e.g., a request from a database client). The slave node sends a request to a master node to assign a commit identifier to the transaction at 1052. The request can include a transaction identifier associated with the transaction.

The slave node receives the commit identifier from the master node at 1056. At 1060, the slave node writes a commit log entry for the transaction, which includes the transaction identifier and the commit identifier. In at least some implementations, the slave node can send a commit confirmation (e.g., a post commit confirmation that indicates that the commit log entry was written by the slave node) to the master node at 1064.

FIG. 10C illustrates operations occurring at a slave node according to a method 1070 implementing a commit protocol according to an embodiment of the present disclosure. At 1074, the slave node receives a database transaction that includes one or more requests for a database operation (e.g., DML statements). The slave node sends a request to the master node to assign a commit identifier to the transaction at 1078. The request includes a transaction identifier for the transaction. The request can include additional information, such as a log position associated with the transaction in a log maintained by the slave node. At 1082, the slave node writes a log entry associated with the transaction. The log entry can include the transaction identifier for the transaction and the slave log position associated with the transaction.

The slave node receives the commit identifier for the transaction at 1086. At 1090, the slave node writes a commit log entry for the transaction. The commit log entry can include the transaction identifier and the commit identifier for the transaction. In at least some implementations of the method 1070, the slave node can send a commit confirmation to the master node at 1094. The commit confirmation (e.g., post commit notification) can include the transaction identifier for the transaction written to the commit log at 1090, and can indicate to the master node that the commit log entry was written, or that the slave node otherwise no longer needs the master node to maintain the transaction identifier and commit identifier in an in-memory reference maintained by the master node.

Example 11—Computing Systems

Figure 11:
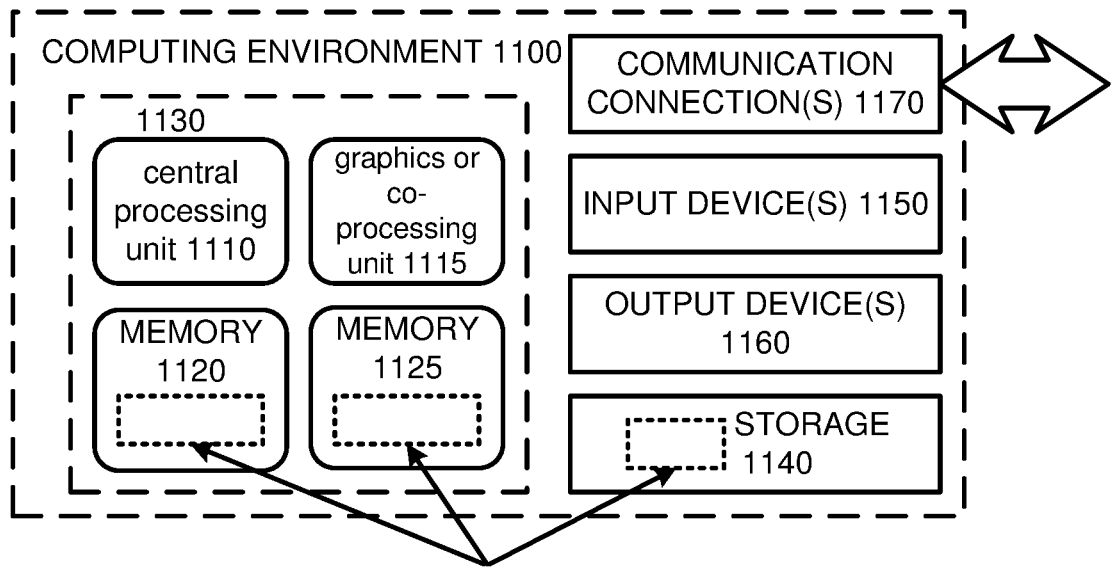
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as instructions implementing a disclosed commit protocol (e.g., instructions for carrying out the protocol as a master node or a slave node). A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory

1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125 can also store the in-memory reference that includes TID/CID information.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity, such as communication between a master node and a slave node. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein, and can implement a host or node. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 12:
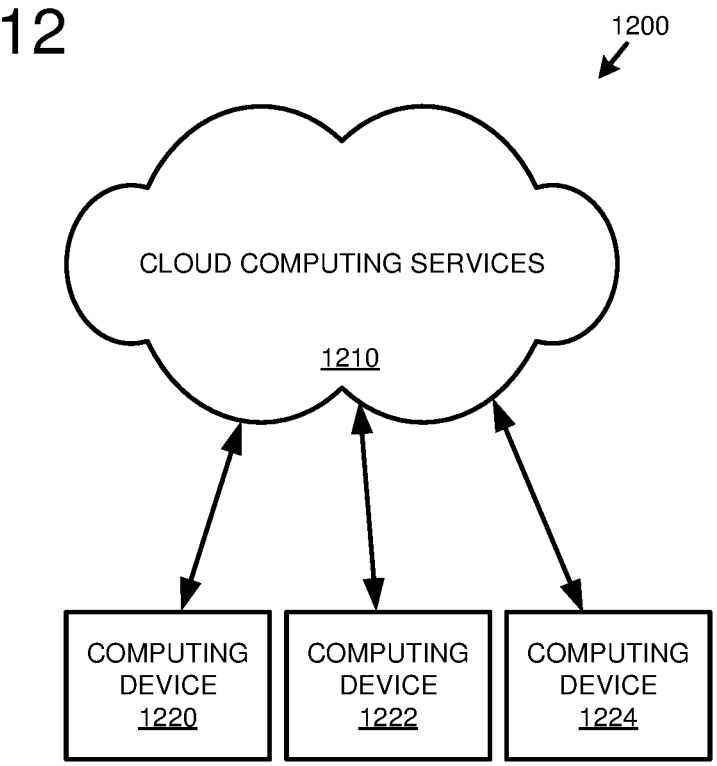
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. The computing devices (e.g., 1220, 1222, and 1224) can utilize the cloud computing services 1210 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
one or more hardware processors;
one or more memories coupled to the one or more hardware processors; and
one or more computer-readable storage media comprising computer-executable instructions that, when executed, cause the computing system to perform operations comprising:
receiving an operation to create, modify, or delete an object stored by the computing system, wherein the object is not a relational database table;
sending a commit request to a node of a relational database system to commit a transaction comprising the operation, the request comprising a transaction identifier for the transaction;
writing a log entry associated with the transaction and comprising the transaction identifier to a log;
after the computing system has been restarted, the computing system having been restarted after the sending of the commit request, reading the log and identifying one or more uncommitted transactions in the log, the one or more uncommitted transactions comprising the transaction;
in response to the identifying one or more uncommitted transactions in the log, sending a request to the node of the relational database system for a commit status of the transaction;
in response to the sending the request, receiving commit status information from the node of the relational database system for the transaction, wherein the commit status information comprises a commit timestamp for the transaction; and
in response to the receiving the commit status information from the node of the relational database system for the transaction, marking the transaction as committed.

2. The computing system of claim 1, the operations further comprising:
associating the commit timestamp for the transaction with the transaction in an in-memory reference.

3. The computing system of claim 1, wherein the marking the transaction as committed comprises writing a commit log entry for the transaction, the commit log entry comprising the commit timestamp.

4. The computing system of claim 1, the operations further comprising:
associating the commit timestamp with the transaction; and
in response to associating the commit timestamp with the transaction, sending a communication to the node of the relational database system that an association between the commit timestamp and the transaction identifier maintained by the node of the relational database system can be discarded by the node of the relational database system.

5. The computing system of claim 4, wherein the association between the commit timestamp and the transaction identifier is maintained by the node of the relational database system in an in-memory structure and the association is removed from the in-memory structure in response to receiving the communication from the computing system that the transaction identifier can be discarded.

6. The computing system of claim 1, wherein the object is a document of a document store.

7. The computing system of claim 1, wherein the object is in a XML, JAVASCRIPT OBJECT NOTATION, key-value, or graph format.

8. The computing system of claim 1, wherein the sending the commit request is not in response to a commit processing request received from the node of the relational database system.

9. The computing system of claim 1, wherein changes to objects stored by the computing system, the objects comprising the object, are recorded in a virtual file.

10. The computing system of claim 9, wherein changes to the objects are also stored in-memory.

11. The computing system of claim 1, wherein the object is an object of a plurality of objects stored in-memory in the computing system and wherein the plurality of objects are maintained in a plurality of segments, at least a portion of the segments of the plurality of segments comprising multiple objects of the plurality of objects.

12. The computing system of claim 11, wherein, for objects of the plurality objects, a segment stores a version identifier, a commit timestamp, and document data associated with a respective object.

13. The computing system of claim 12, wherein the version identifier is a new version identifier and the segment further stores an old version identifier for a prior version of the respective object modified to create the respective object having the new version identifier.

14. The computing system of claim 11, further comprising an index, the index comprising elements pointing to objects of the plurality of objects.

15. The computing system of claim 1, wherein the computing system receives from the node of the relational database system commit information for a plurality of objects, the plurality of objects comprising the object, and wherein the computing system uses the commit information for the plurality of objects to restore a state of the computing system prior to the restarting.

16. A method, implemented in a computing system comprising one or more hardware processors and at least one memory coupled to the one or more hardware processors, comprising:
receiving an operation to create, modify, or delete a document stored by the computing system, wherein the document is not a relational database table;
sending a commit request to a node of a relational database system to commit a transaction comprising the operation, the request comprising a transaction identifier for the transaction;
writing a log entry associated with the transaction and comprising the transaction identifier to a log;
after the computing system has been restarted, the computing system having been restarted after the sending of the commit request, reading the log and identifying one or more uncommitted transactions in the log, the one or more uncommitted transactions comprising the transaction;
in response to the identifying one or more uncommitted transactions in the log, sending a request to the node of the relational database system for a commit status of the transaction;
in response to the sending the request, receiving commit status information from the node of the relational database system for the transaction, wherein the commit status information comprises a commit timestamp for the transaction; and
in response to the receiving the commit status information from the node of the relational database system for the transaction, marking the transaction as committed.

17. The method of claim 16, wherein the sending the commit request is not in response to a commit processing request received from the node of the relational database system, the method further comprising:
associating the commit timestamp with the transaction; and
in response to associating the commit timestamp with the transaction, sending a communication to the node of the relational database system that an association between the commit timestamp and the transaction identifier maintained by the node of the relational database system can be discarded by the node of the relational database system.

18. One or more computer-readable storage media comprising:
computer-executable instructions, that, when executed by a computing system comprising at least one hardware processor and at least one memory coupled to the at least one hardware processor, cause the computing system to receive an operation to create, modify, or delete a document stored by the computing system, wherein the document is not a relational database table;
computer-executable instructions, that, when executed by the computing system, cause the computing system to send a commit request to a node of a relational database system to commit a transaction comprising the operation, the request comprising a transaction identifier for the transaction;
computer-executable instructions, that, when executed by the computing system, cause the computing system to write a log entry associated with the transaction and comprising the transaction identifier to a log;
computer-executable instructions, that, when executed by the computing system, cause the computing system to, after the computing system has been restarted, the computing system having been restarted after the sending of the commit request, read the log and identifying one or more uncommitted transactions in the log, the one or more uncommitted transactions comprising the transaction;
computer-executable instructions, that, when executed by the computing system, cause the computing system to, in response to the identifying one or more uncommitted transactions in the log, send a request to the node of the relational database system for a commit status of the transaction;
computer-executable instructions, that, when executed by the computing system, cause the computing system to, in response to the sending the request, receive commit status information from the node of the relational database system for the transaction, wherein the commit status information comprises a commit timestamp for the transaction; and
computer-executable instructions, that, when executed by the computing system, cause the computing system to, in response to the receiving the commit status information from the node of the relational database system for the transaction, mark the transaction as committed.

19. The one or more computer-readable storage media of claim 18, wherein the sending the commit request is not in response to a commit processing request received from the node of the relational database system, further comprising:
computer-executable instructions, that, when executed by the computing system, cause the computing system to associate the commit timestamp with the transaction; and
computer-executable instructions, that, when executed by the computing system, cause the computing system to, in response to associating the commit timestamp with the transaction, send a communication to the node of the relational database system that an association between the commit timestamp and the transaction identifier maintained by the node of the relational database system can be discarded by the node of the relational database system.

20. The one or more computer-readable storage media of claim 18, wherein the sending the commit request is not in response to a commit processing request received from the node of the relational database system.

\* \* \* \* \*